(12) United States Patent
Someya et al.

(10) Patent No.: US 7,196,762 B2
(45) Date of Patent: *Mar. 27, 2007

(54) TFT ACTIVE MATRIX LIQUID CRYSTAL DISPLAY DEVICES

(75) Inventors: Sakae Someya, Sanwa-machi (JP); Ryuuzoh Nashimoto, Mobara (JP); Hirofumi Suzuki, Mobara (JP); Katsuhiko Yarita, Ichibara (JP); Shinji Matsumoto, Mobara (JP); Akira Sasano, Hirai Hinode-machi (JP); Hideaki Taniguchi, Mobara (JP); Ryouji Oritsuki, Shirako-machi (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/244,079

(22) Filed: Oct. 6, 2005

(65) Prior Publication Data

US 2006/0028605 A1 Feb. 9, 2006

Related U.S. Application Data

(60) Continuation of application No. 10/986,854, filed on Nov. 15, 2004, now Pat. No. 6,992,744, which is a continuation of application No. 10/084,475, filed on Feb. 28, 2002, now Pat. No. 6,839,098, which is a continuation of application No. 09/749,385, filed on Dec. 28, 2000, now Pat. No. 6,384,879, which is a continuation of application No. 09/192,313, filed on Nov. 16, 1998, now Pat. No. 6,184,963, which is a continuation of application No. 08/924,737, filed on Sep. 5, 1997, now Pat. No. 5,838,399, which is a continuation of application No. 08/610,148, filed on Feb. 29, 1996, now Pat. No. 5,708,484, which is a division of application No. 08/457,577, filed on Jun. 1, 1995, now Pat. No. 5,532,850, which is a division of application No. 08/277,434, filed on Jul. 18, 1994, now Pat. No. 5,528,396, which is a division of application No. 07/910,455, filed on Jul. 8, 1992, now Pat. No. 5,331,447, which is a continuation of application No. 07/205,185, filed on Jun. 10, 1988, now Pat. No. 5,132,820.

(30) Foreign Application Priority Data

| Jun. 10, 1987 | (JP) | 62-144913 |
| Sep. 25, 1987 | (JP) | 62-242363 |
| Dec. 9, 1987 | (JP) | 62-309601 |

(51) Int. Cl.
*G02F 1/1343* (2006.01)

(52) U.S. Cl. .............. 349/144; 349/110; 349/146

(58) Field of Classification Search ............ 349/144, 349/146, 110, 111, 43, 141–143, 139
See application file for complete search history.

(56) References Cited

U.S. PATENT DOCUMENTS 3,824,003 A 7/1974 Koda et al.

(Continued)

FOREIGN PATENT DOCUMENTS

GB 2133602 7/1984

(Continued)

OTHER PUBLICATIONS

Proceedings of the SID, vol. 31/1, 1990, pp. 13-17.

(Continued)

*Primary Examiner*—Dung T. Nguyen
*Assistant Examiner*—Thoi V. Duong
(74) *Attorney, Agent, or Firm*—Anonelli, Terry, Stout and Kraus, LLP

(57) ABSTRACT

There are disclosed various types of TFT active matrix liquid crystal display devices and method of fabrication thereof in which a pixel is divided into three parts, a capacitor is added to each pixel, light shielding is applied to each TFT, and the matrix is driven by a DC cancelling technique.

20 Claims, 15 Drawing Sheets

U.S. PATENT DOCUMENTS

| | | |
|---|---|---|
| 4,215,156 A | 7/1980 | Dalal et al. |
| 4,386,352 A | 5/1983 | Nonomura et al. |
| 4,431,271 A | 2/1984 | Okubo |
| 4,537,471 A | 8/1985 | Grinberg et al. |
| 4,582,395 A | 4/1986 | Morizumi |
| 4,602,850 A | 7/1986 | DeBenedetti |
| 4,639,087 A | 1/1987 | Cannella |
| 4,653,862 A | 3/1987 | Morozumi |
| 4,671,642 A | 6/1987 | Ohkubo et al. |
| 4,678,282 A | 7/1987 | Yaniv et al. |
| 4,705,358 A | 11/1987 | Yamazaki et al. |
| 4,714,636 A | 12/1987 | Yokono et al. |
| 4,728,172 A | 3/1988 | Cannella |
| 4,728,175 A | 3/1988 | Baron |
| 4,738,749 A | 4/1988 | Maurice et al. |
| 4,759,610 A | 7/1988 | Yanagisawa |
| 4,762,398 A | 8/1988 | Yasui et al. |
| 4,770,501 A | 9/1988 | Tamura et al. |
| 4,773,737 A | 9/1988 | Yokono et al. |
| 4,775,861 A | 10/1988 | Saito |
| 4,778,560 A | 10/1988 | Takeda et al. |
| 4,786,148 A | 11/1988 | Sekimura et al. |
| 4,816,885 A | 3/1989 | Yoshida et al. |
| 4,821,092 A | 4/1989 | Noguchi |
| 4,824,213 A | 4/1989 | Morokawa |
| 4,845,482 A | 7/1989 | Howard et al. |
| 4,909,602 A | 3/1990 | Kaneko et al. |
| 4,936,656 A | 6/1990 | Yamashita et al. |
| 4,938,566 A | 7/1990 | Takeda et al. |
| 4,955,697 A | 9/1990 | Tsukada et al. |
| 4,991,939 A | 2/1991 | Momose et al. |
| 5,028,122 A | 7/1991 | Hamada et al. |
| 5,054,887 A | 10/1991 | Kato et al. |
| 5,132,820 A | 7/1992 | Someya et al. |
| 5,151,807 A | 9/1992 | Katayama et al. |
| 5,187,602 A | 2/1993 | Ikeda et al. |
| 5,270,845 A | 12/1993 | Sakamoto et al. |
| 5,296,870 A | 3/1994 | Nicholas |
| 5,331,447 A | 7/1994 | Someya et al. |
| 5,528,396 A | 6/1996 | Someya et al. |
| 5,532,850 A | 7/1996 | Someya et al. |
| 5,838,399 A | 11/1998 | Someya et al. |
| 6,184,963 B1 | 2/2001 | Someya et al. |

FOREIGN PATENT DOCUMENTS

| | | |
|---|---|---|
| JP | 000530 | 5/1980 |
| JP | 077887 | 6/1981 |
| JP | 57-049994 | 3/1982 |
| JP | 144888 | 8/1983 |
| JP | 59-009636 | 1/1984 |
| JP | 59-078388 | 5/1984 |
| JP | 59-105617 | 6/1984 |
| JP | 59-119322 | 7/1984 |
| JP | 60-017962 | 1/1985 |
| JP | 60-006286 | 4/1985 |
| JP | 60-097322 | 5/1985 |
| JP | 60-090428 | 6/1985 |
| JP | 60-112089 | 7/1985 |
| JP | 60-207118 | 10/1985 |
| JP | 60-227235 | 11/1985 |
| JP | 60-230117 | 11/1985 |
| JP | 60-233621 | 11/1985 |
| JP | 61-003118 | 1/1986 |
| JP | 61-029820 | 2/1986 |
| JP | 61-041223 | 3/1986 |
| JP | 61 044468 | 3/1986 |
| JP | 61-077886 | 4/1986 |
| JP | 067095 | 4/1986 |
| JP | 61-093488 | 5/1986 |
| JP | 121034 | 6/1986 |
| JP | 61 172370 | 8/1986 |
| JP | 61-183687 | 8/1986 |
| JP | 61-184517 | 8/1986 |
| JP | 61-157927 | 9/1986 |
| JP | 62-010619 | 1/1987 |
| JP | 62-036687 | 2/1987 |
| JP | 62-046574 | 2/1987 |
| JP | 044717 | 2/1987 |
| JP | 60 093978 | 4/1987 |
| JP | 62-073699 | 4/1987 |
| JP | 62-076545 | 4/1987 |
| JP | 62-084563 | 4/1987 |
| JP | 62 089021 | 4/1987 |
| JP | 62-089021 | * 4/1987 |
| JP | 091993 | 4/1987 |
| JP | 62-102277 | 5/1987 |
| JP | 62-131578 | 6/1987 |
| JP | 62-015217 | 7/1987 |
| JP | 62-204568 | 9/1987 |
| JP | 62-269120 | 11/1987 |
| JP | 63-218926 | 9/1988 |
| JP | 1-136124 | 5/1989 |
| JP | 1-248136 | 10/1989 |
| JP | 1-267618 | 10/1989 |
| JP | 2-106723 | 4/1990 |
| JP | 179616 | 7/1990 |

OTHER PUBLICATIONS

IEEE Transactions on Electron Devices, vol. ED-20, Nov. 1973, pp. 995-997 (Brody et al., "A 6×6 Inch 20 Lines-per-Inch Liquid-Crystal Display Panel").

* cited by examiner

TFT ACTIVE MATRIX LIQUID CRYSTAL DISPLAY DEVICES

This application is a continuation of application Ser. No. 10/986,854, filed Nov. 15, 2004, now U.S. Pat. No. 6,992,744; which, in turn is a continuation of application Ser. No. 10/084,475, filed Feb. 28, 2002, now U.S. Pat. No. 6,839,098; which, in turn, is a continuation of application Ser. No. 09/749,385, filed Dec. 28, 2000, now U.S. Pat. No. 6,384,879; which was a continuation of application Ser. No. 09/192,313, filed Nov. 16, 1998, now U.S. Pat. No. 6,184,963; which was a continuation of application Ser. No. 08/924,737, filed Sep. 5,1997, now U.S. Pat. No. 5,838,399; which was a continuation of application Ser. No. 08/610,148, filed Feb. 29, 1996; now U.S. Pat. No. 5,708,484; which was a divisional of application Ser. No. 08/457,577, filed Jun. 1, 1995, now U.S. Pat. No. 5,532,850; which was a divisional of application Ser. No. 08/277,434, filed Jul. 18,1994, now U.S. Pat. No. 5,528,396; which was a divisional of application Ser. No. 07/910,455, filed Jul. 8,1992, now U.S. Pat. No. 5,331,447; and which, in turn, was a continuation of application Ser. No. 07/205,185, filed Jun. 10, 1988, now U.S. Pat. No. 5,132,820; and the entire disclosures of all of which are hereby incorporated by reference.

BACKGROUND OF THE INVENTION

1. Field of the Invention

The present invention is generally directed to display devices and, more particularly, to active matrix liquid crystal display devices in which pixels (e.g., picture elements or picture cells) are formed by use of thin film transistors and pixel electrodes.

2. Description of the Invention

An active matrix liquid crystal display device includes a liquid crystal display unit on which a plurality of pixels are arranged in matrix form. Each individual pixel on the liquid crystal display unit is disposed in each of intersection regions defined by two adjacent scanning signal lines (gate signal lines) and two adjacent image signal lines (drain signal lines). The plurality of scanning signal lines extending in the row-direction (horizontal direction) are arrayed in the column-direction, while the plurality of image signal lines extending in the column-direction (vertical direction), intersecting the scanning signal lines, are arrayed in the row-direction.

The pixel is formed mainly of a liquid crystal in combination with a thin film transistor (TFT), a common transparent pixel electrode and a transparent pixel electrode which are disposed through the liquid crystal. The transparent pixel electrode and the thin film transistor are each provided for every pixel. The transparent pixel electrode is connected to a source electrode of the thin film transistor. A drain electrode of the thin film transistor is connected to the image signal lines, while a gate electrode is connected to the scanning signal lines.

A typical arrangement is such that unnecessary incident light emerging from a panel front surface is shielded by a light shielding film formed on the upper portion of TFT, and beams of backlight which are not required are shielded by the non-transparent gate electrode. In accordance with a variety of experiments performed, the present inventors have found that sufficient light shielding effects cannot be obtained by a TFT gate electrode of an ordinary size.

When the light strikes upon an amorphous semiconductor layer of the thin film transistor, electron-hole couplings are generated, thereby deteriorating OFF-characteristics of the transistor. Hence, it is required that the amorphous semiconductor layer be arranged so as not to undergo the irradiation of light as much as possible. The light for display is classified into two types: natural incident light (or light of a room lamp) emerging from the front surface of the liquid crystal display panel and incident backlight of a fluorescent lamp which emerges from the underside of the panel.

The above-described liquid crystal display device tends to increase in the size of a pixel thereof, as the liquid crystal display unit is correspondingly increased in configuration. For instance, the size of pixel of the conventional liquid crystal display unit was 0.2×0.2 (mm$^2$) However, the present inventors have developed a liquid crystal display device having a pixel size of 0.32×0.32 (mm$^2$).

In this type of liquid crystal display device, foreign substances such as dust or the like are intermixed in the liquid crystal display device in the manufacturing process, or the foreign substances are adhered to a mask for use with photolithography. If the foreign substances are present or intermixed in between the source electrode (or transparent pixel electrode) and the drain electrode of the thin film transistor, short-circuiting takes place between these electrodes, resulting in a so-called point defect in which the short-circuited pixel is deteriorated. If the foreign substances are likewise present or intermixed in between the source electrode (transparent pixel electrode) and the gate electrode of the thin film transistor, the same point defect is caused. From this phenomenon, the present inventors have found out such a problem that the point defect (e.g., a loss of pixel), inherent in the above-described liquid crystal display device, becomes conspicuous, as each individual pixel increases in size.

Incidentally, the arrangement that a configuration of the gate electrode is made larger than the semiconductor layer has already been known in Japanese Patent Laid-Open Publication No. 17962/1985. However, even when simply increasing the size of the gate electrode, a parasitic capacitance between the gate electrode and the source electrode also increases, and a DC component applied to the liquid crystal due to scanning signals is increased. In all, the undesirable results become so prevalent that utilization is difficult.

An example of an active matrix liquid crystal display device is described on, e.g., pp. 193 to 200 of NIKKEI ELECTRONICS issued on Dec. 15, 1986, published by Nikkei McGraw-Hill Co., Ltd.

The following listings are exemplary of the pixel dividing technique in the active matrix liquid crystal display device: Japanese Patent Laid-Open Publication Nos. 49994/1982, 78388/1984, 97322/1985 and 77886/1986.

SUMMARY OF THE INVENTION

It is a primary object of the present invention to provide a liquid crystal display device capable of reducing deterioration in OFF-characteristics of a TFT due to light incident on the TFT.

To this end, according to one aspect of the invention, there is provided a liquid crystal display device capable of improving the OFF-characteristics of the TFT and restraining a DC component applied to the liquid crystal.

According to another aspect of the invention, there is provided, in the liquid crystal display device, a technique capable of diminishing a point defect which causes deterioration of pixels on a liquid crystal display unit.

According to still another aspect of the invention, there is provided, in the liquid crystal display device, a technique capable of making it hard to visually perceive the point defect which appears on the liquid crystal display unit.

According to a further aspect of the invention, there is provided, in the liquid crystal display device, a technique capable of decreasing the point defect which causes the deterioration of the pixels on the liquid crystal display unit and also reducing black scattering appearing on the liquid crystal display unit thereof.

According to a still further aspect of the invention, there is provided, in the liquid crystal display device, a technique capable of accomplishing the above-described objects, decreasing a resistance value of scanning signal lines and reducing the point defect attributed to short-circuiting between a pixel electrode of the pixel and the scanning signal lines.

Another object of the invention is to provide a technique capable of reducing the black scattering and preventing disconnection of the electrodes of a holding (or storage) capacitance element for diminishing the black scattering.

Another object of the invention is to provide, in the liquid crystal display device, a technique capable of reducing the black scattering with a simple constitution.

Another object of the invention is to provide, in the liquid crystal display device, a technique capable of reducing the DC component applied to the liquid crystal of the liquid crystal display unit and diminishing the black scattering.

Another object of the invention is to provide, in the liquid crystal display device including color filters, a technique capable of reducing the point defect which appears on the liquid crystal display unit and ensuring positioning allowance dimensions with respect to each individual pixel on the liquid crystal display unit and each individual color filter for every color.

Another object of the invention is to provide, in the liquid crystal display device, a technique capable of diminishing the point defect appearing on the liquid crystal display unit and decreasing the probability that the point defect or a linear defect occurs on the liquid crystal display unit.

Another object of the invention is to provide, in the liquid crystal display device, a technique capable of diminishing the point defect appearing on the liquid crystal display unit and improving an area (an opening rate) of the pixel electrode of every pixel on the liquid crystal display unit.

Another object of the invention is to provide, in the liquid crystal display device, a technique capable of enhancing resolution of a color picture.

Another object of the invention is to provide a technique capable of accomplishing the above-described objects and reducing an area of wiring or eliminating a multilayered wiring structure.

Another object of the invention is to provide, in the liquid crystal display device, a technique capable of reducing the deterioration of connection between the thin film transistor and the pixel electrode.

Another object of the invention is to provide a liquid crystal display device capable of enhancing the contrast.

The principal features of the present invention are described as follows:

(1) A liquid crystal layer is sealed between a top-surface-side glass substrate (SUB2) on which a common electrode (ITO2) is formed and an underside glass substrate (SUB1) on which a pixel electrode (ITO1) and a TFT (TFT1) are formed (FIGS. 1 and 2). Viewed from the liquid crystal layer, a gate electrode (GT) of the TFT is disposed in close proximity to the underside substrate (SUB1), while a semiconductor layer (AS) is spaced away therefrom. The gate electrode (GT) has a large size which is sufficient to completely cover (when viewed from below) the semiconductor layer (AS).

According to this constitution, OFF-characteristics of the TFT can be improved, because the incident backlight passing through the underside substrate (SUB1) does not reach the semiconductor layer (AS) on account of its being shielded by the gate electrode (GT).

(2) The pixels are disposed in intersection regions defined by two scanning signal lines and two image signal lines. The thin film transistor of the pixel selected by one of two scanning signal lines is split into a plurality of segments. The thus divided thin film transistor is connected to a plurality of segments into which the pixel electrode is split. A holding capacitance element is constructed in such a way that the divided pixel electrodes serve as one electrode thereof, and the other of two scanning signal lines serves as the other electrode thereof by using it as a capacitance electrode line.

In this arrangement, only part of the divided portions of the pixel becomes the point defect. Otherwise, the point defect will spread over the entire pixel. It is therefore possible to diminish the point-defect of the pixel and at the same time to improve a holding characteristic of a voltage applied to the liquid crystal due to the holding capacitance element, resulting in a drop in the amount of black scattering. Particularly, the divided pixels contribute to diminution in point defect derived from the short-circuit between the gate electrode and the source electrode or the drain electrode of the thin film transistor. Besides, the point defect attributed to the short-circuit between the pixel electrode and the other electrode of the holding capacitance element can be reduced. Consequently, the point defect created in part of the split portions of the pixels is small as compared with the area of the entire pixel, whereby it is hard to visually perceive the point defect.

Light shielding effects are enhanced by broadening the gate electrode. On the other hand, there arises a reverse effect in which the DC component applied to the liquid crystal becomes a problem because of an increase in overlapping parasitic capacitance between the source electrode and the drain electrode. This reverse effect can, however, be reduced by virtue of the holding capacitor.

(3) The scanning signal lines are composed of composite films obtained by superposing a plurality of conductive layers on each other. The gate electrode and the capacitance electrode line are each composed of single layered films each consisting of one conductive layer among the composite films.

Based on this construction, in addition to the above-described effects, it is feasible to decrease a resistance value of the scanning signal lines and reduce the point defect due to the short-circuit between the pixel electrode and the scanning signal lines.

(4) Formed between one electrode of the holding capacitance element and a dielectric film thereof is a base layer composed of a first conductive film and a second conductive film which is formed thereon and has a smaller specific resistance value and a smaller configuration than those of the first conductive film. The above-described one electrode is connected to the first conductive film exposed from the second conductive film of the base layer.

Owing to this arrangement, it is possible to minimize the disconnection of one electrode of the holding capacitance element, because one electrode of the holding capacitance element can surely be bonded along a stepped portion caused by the other electrode thereof.

(5) The capacitance electrode line of the first stage or the final stage is connected to the common pixel electrode of the pixel.

In this arrangement, the capacitance electrode line of the first stage or the final stage and part of the conductive layer of an outside extension wire may be formed into one united body, and the common pixel electrode is connected to the outside extension wire. The scanning signal lines can therefore be connected to the common pixel electrode with a simple constitution.

(6) The capacitance electrode line or the scanning signal line of the first stage is connected to the scanning signal line or the capacitance electrode line of the final stage.

Based on this arrangement, the scanning signal lines and the capacitance electrode lines are all connected to a vertical scanning circuit, and hence a DC offset system (a DC cancel system) may be adopted. As a result, the DC component applied to the liquid crystal can be reduced, thereby increasing a life span of the liquid crystal.

(7) In accordance with an embodiment III of the present invention which is illustrated in FIG. 15A, light shielding films 1 and 2 are provided to fill up gaps formed between the pixel electrodes ITO1 through ITO3.

In this embodiment III, the problem that the light such as backlight leaks out through the gaps between the pixel electrodes can be almost obviated.

(8) In accordance with an embodiment IV of the present invention, light shielding films 3 and 4 are electrically connected to an adjacent scanning line GL.

In the embodiment IV, capacitors may equivalently be formed between the light shielding films 1 and 2 (adjacent scanning line) and the respective divided pixel electrodes.

These and other objects, features and advantages of the invention will become more apparent on reading the following detailed description with reference to the accompanying drawings.

The constitution of the present invention will hereinafter be described in combination with one embodiment in which the present invention is applied to the active matrix liquid crystal display device.

In all the accompanying drawings which illustrate the embodiments, the components having the same functions are marked with the like symbols, and their repetitive descriptions are therefore omitted herein.

DETAILED DESCRIPTION OF THE PREFERRED EMBODIMENTS

Embodiment I

Figure 1:
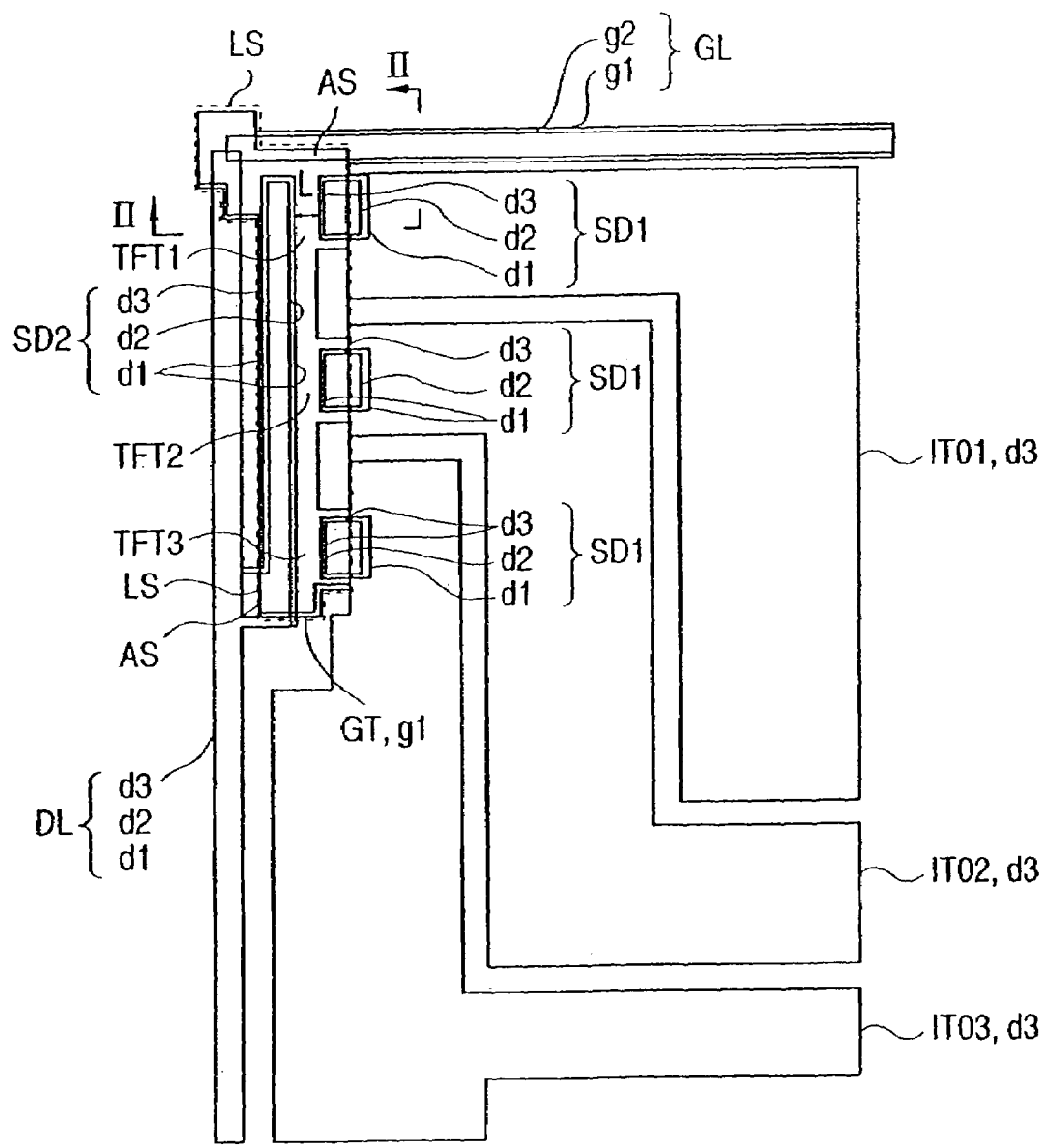
FIG. 1 is a plan view illustrating the principal portion of one pixel on a liquid crystal display unit of an active matrix color liquid crystal display device in which embodiment I of the present invention is incorporated.
Figure 2:
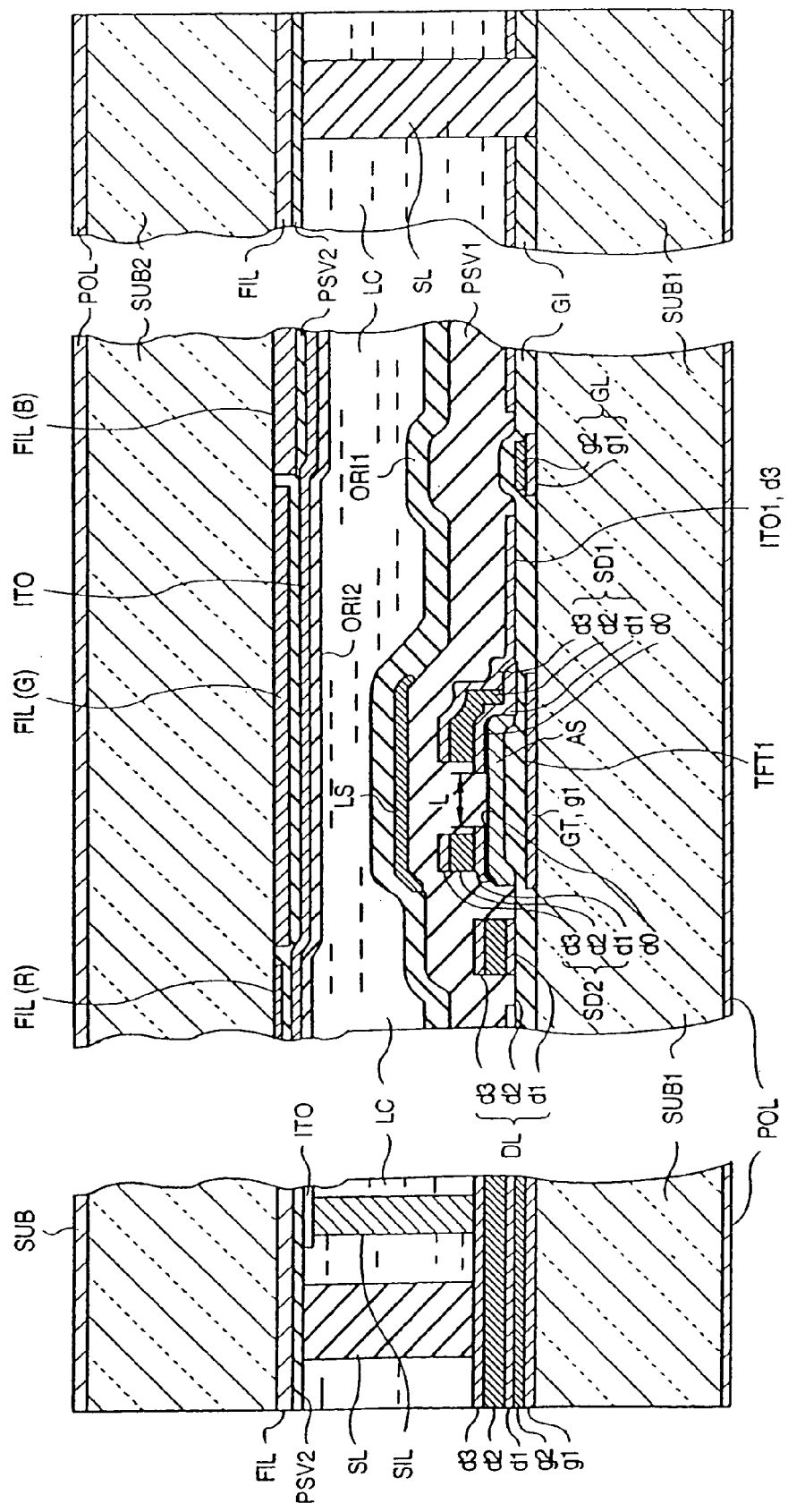
FIG. 2 is a sectional view taken substantially along the line II—II of FIG. 1, illustrating the portion cut by this cutting-plane line and peripheral portions of a sealing portion.
Figure 3:
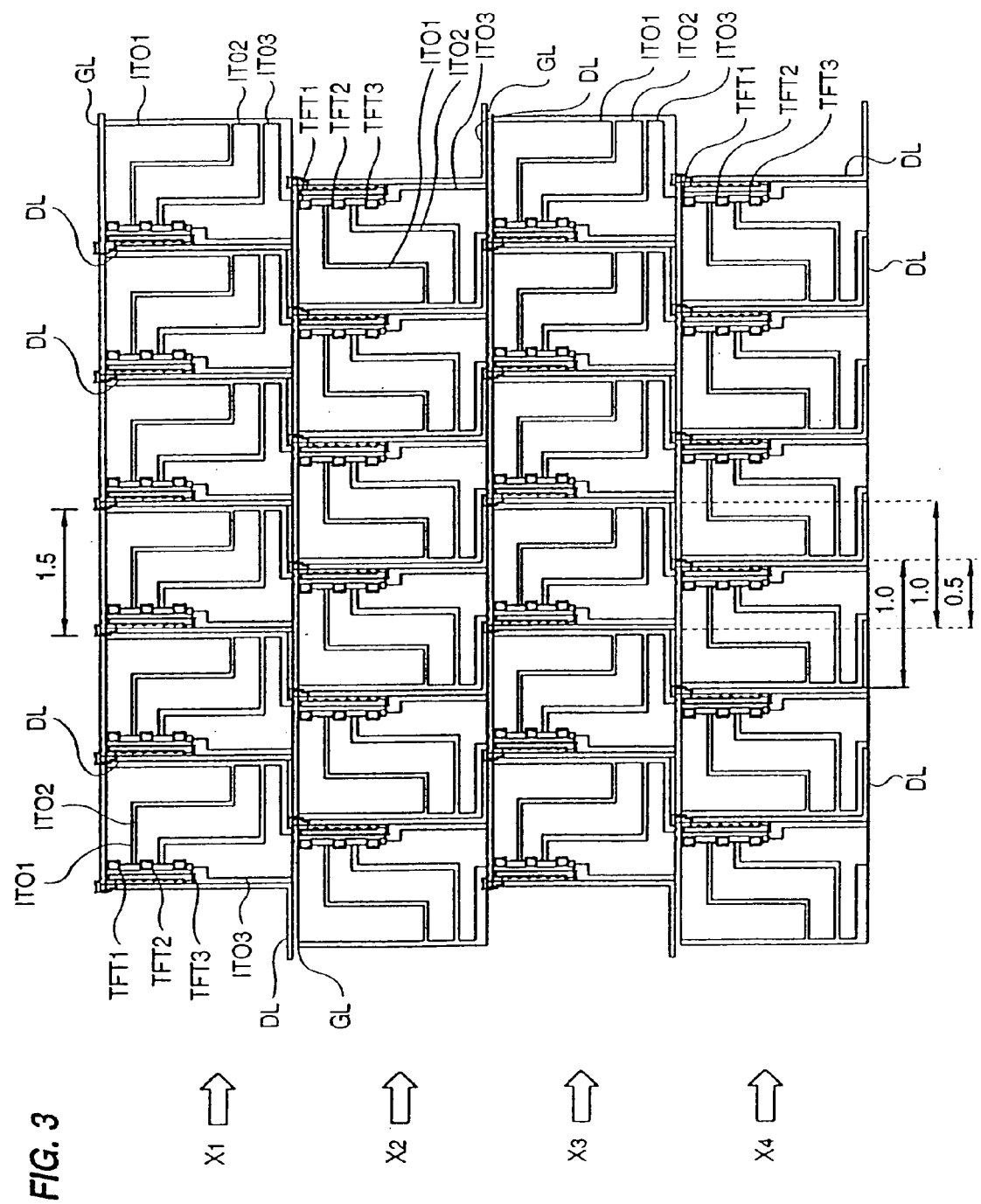
FIG. 3 is a plan view showing the principal portion of a liquid crystal display unit on which a plurality of pixels are disposed depicted in FIG. 1.

Turning attention now to FIG. 1 (a plan view of the principal portion), there is illustrated one pixel on a liquid crystal display unit of an active matrix color liquid crystal display device in which an embodiment I of the present invention is actualized. FIG. 2 shows a section cut by the cutting-plane line II—II of FIG. 1. FIG. 3 (a plan view of the principal portion) illustrates the principal portion of the liquid crystal display unit on which a plurality of pixels are disposed depicted in FIG. 1.

As illustrated in FIGS. 1 through 3, in the liquid crystal display device, the pixel including a thin film transistor TFT and a transparent pixel electrode ITO is formed on an inside (on the side of a liquid crystal) surface of a lower transparent glass substrate SUB1. The lower transparent glass substrate SUB1 is shaped with a thickness of, e.g., approximately 1.1 (mm).

Each individual pixel is disposed in an intersection region (a region surrounded by four signal lines) defined by two adjacent scanning signal lines (gate signal lines or horizontal signal lines) GL and two adjacent image signal lines (drain signal lines or vertical signal lines) DL. As depicted in FIGS. 1 to 3, the plurality of scanning signal lines GL extending in the row-direction are disposed (or arrayed) in the column-direction, while the plurality of image signal lines DL extending in the column-direction are disposed (or arrayed) in the row-direction.

The thin film transistor TFT of every pixel is split into three (plural numbers) segments within the pixel, viz., this transistor TFT is composed of thin film transistors (divided thin film transistors) TFT1, TFT2 and TFT3. All of the thin film transistors TFT1 to TFT3 are shaped to virtually have the same size (the width is equal to a channel length). Each of the divided thin film transistors TFT1 to TFT3 is formed mainly of a gate electrode GT, an insulating film GI, and an i-type (intrinsic conductive type in which deterministic impurities are not doped) amorphous Si semiconductor layer AS, and a source electrode SD1 and drain electrode SD2. Note that the source/drain is originally determined by a bias polarity therebetween, but the source/drain is, it should be understood, interchangeable during the operation, because the polarity is reversed during the operation in a circuit of the titled device of this specification. In the following description, however, one is fixedly expressed as a source, and the other a drain for convenience.

Figure 4:
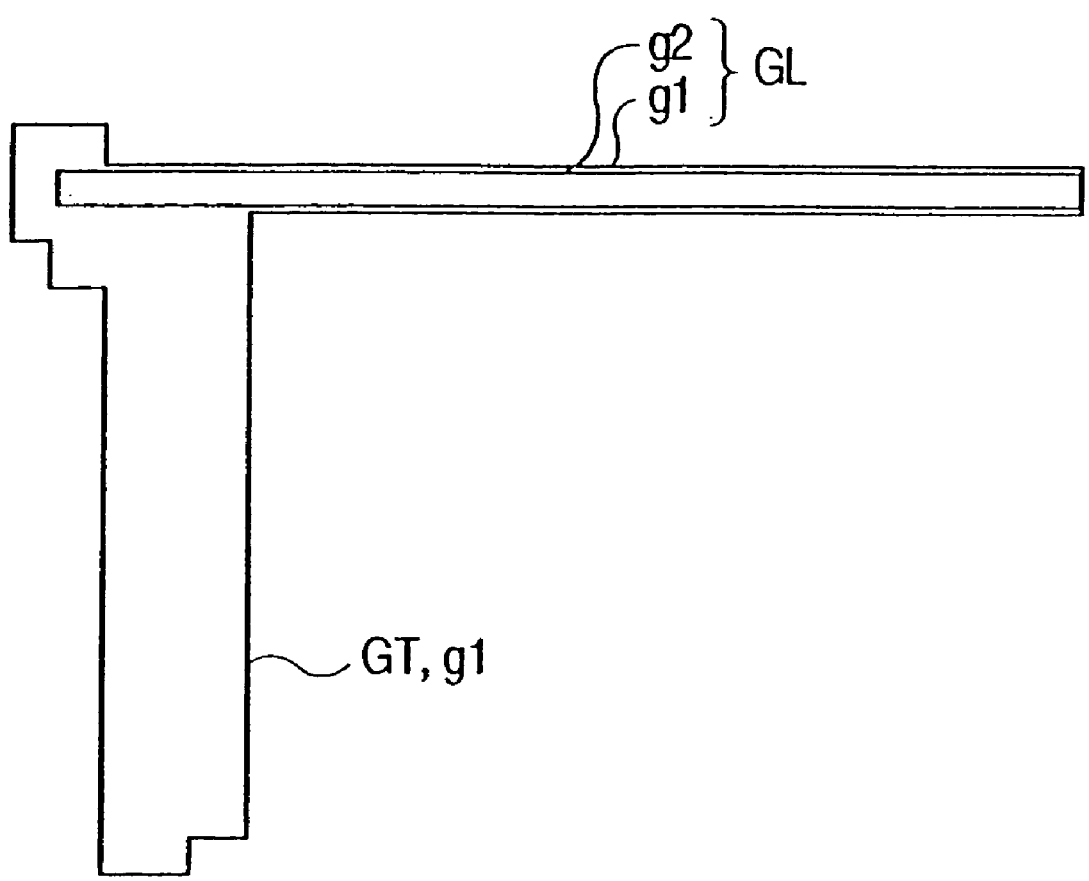
FIGS. 4 to 6 are plan views each showing the principal portion in a predetermined process of manufacturing the pixels depicted in FIG. 1.

The gate electrode GT is, as fully illustrated in FIG. 4 (a plan view of the principal portion in a predetermined manufacturing process), formed to assume a T-shape (it branches off in the T-like configuration) in which to protrusively extend from the scanning signal line GL in the column-direction (e.g., a vertical direction in FIGS. 1 and 4). Namely, the gate electrode GT is arranged to extend virtually in parallel with the image signal line DL. The gate electrodes GT are also arranged to protrusively extend to regions in which the respective thin film transistors TFT1 to TFT3 are formed. The gate electrodes of the thin film transistors TFT1 to TFT3 are formed into one united body (as a common gate electrode) in continuation from the same scanning signal line GL. The gate electrode GT consists of a first single layered conductive film q1 so as to minimize the possibility of forming a large stepped portion (i.e., a step-like configured protrusion) in the forming region of the thin film transistor TFT. The formation of the first conductive film g1 involves the use of, for instance, a chromium (Cr) film having a thickness of approximately 1000 (Å) on the basis of sputtering.

It can be observed from FIGS. 1, 2 and 5 that the gate electrode GT is shaped to be sufficiently larger than the semiconductor layer AS to completely cover this layer AS (when viewed from below). Where a backlight such as a fluorescent lamp or the like is provided underneath the substrate SUB1, the non-transparent Cr gate electrode GT overshadows the semiconductor layer AS, with the result that no backlight strikes upon the layer AS. Hence, a conductive phenomenon caused by the irradiation of light, i.e., the deterioration of OFF-characteristics, is not likely to occur. In connection with an original size of the gate electrode GT, this electrode GT has a minimum width (including an allowance for positioning the gate electrode and the source/drain electrodes) required to span the source/drain electrodes SD1 and SD2; and a length thereof which determines a channel width W depends upon a ratio with respect to a distance L (a channel length) between the source electrode and the drain electrode, i.e., such a length is conditional on a factor of W/L which determines a mutual conductance gm.

The configuration of the gate electrode employed in this embodiment is, as a matter of course, more than the original one.

If the gate electrode is put into consideration in terms of only a gate function and a light shielding function as well, the gate electrode and the line GL cooperate with a single layer to form one united body. In this case, as a non-transparent (or opaque) conductive material, Al containing Si, pure Al or Al containing Pd may be selected.

The scanning signal line GL consists of a composite film of the first conductive film g1 and the second conductive film g2 superposed thereon. The first conductive film g1 of the scanning signal line GL is formed in the same manufacturing process as that of the first conductive film g1 of the gate electrode GT, and is also arranged to be integral therewith. Based on the sputtering technique, the second conductive film g2 is formed of, e.g., an aluminum (A1) film which is 2000 to 4000 (Å) in thickness. The second conductive film g2 serves to decrease a resistance value of the scanning signal line GL and is capable of increasing a velocity (a writing characteristic of information on the pixels) at which a signal on a scanning signal line is transmitted.

The scanning signal line GL is arranged such that the second conductive film g2 has a width smaller than that of the first conductive film g1. That is, the scanning signal line GL is formed so as to level the surface of an insulating film GI superposed thereon, because a stepped configuration of the side wall may be moderated.

The insulating film GI serves as a gate insulating film for each of the thin film transistors TFT1 to TFT3. The insulating films GI are disposed on the gate electrode GT and the scanning signal line GL. The formation of the insulating film GI involves the use of, e.g., a silicon nitride film having a thickness of 3000 (Å) or-thereabouts on the basis of plasma CVD. As described above, the surfaces of the insulating films GI are levelled in the forming regions of the thin film transistors TFT1 through TFT3 and of the scanning signal lines GL.

Figure 5:
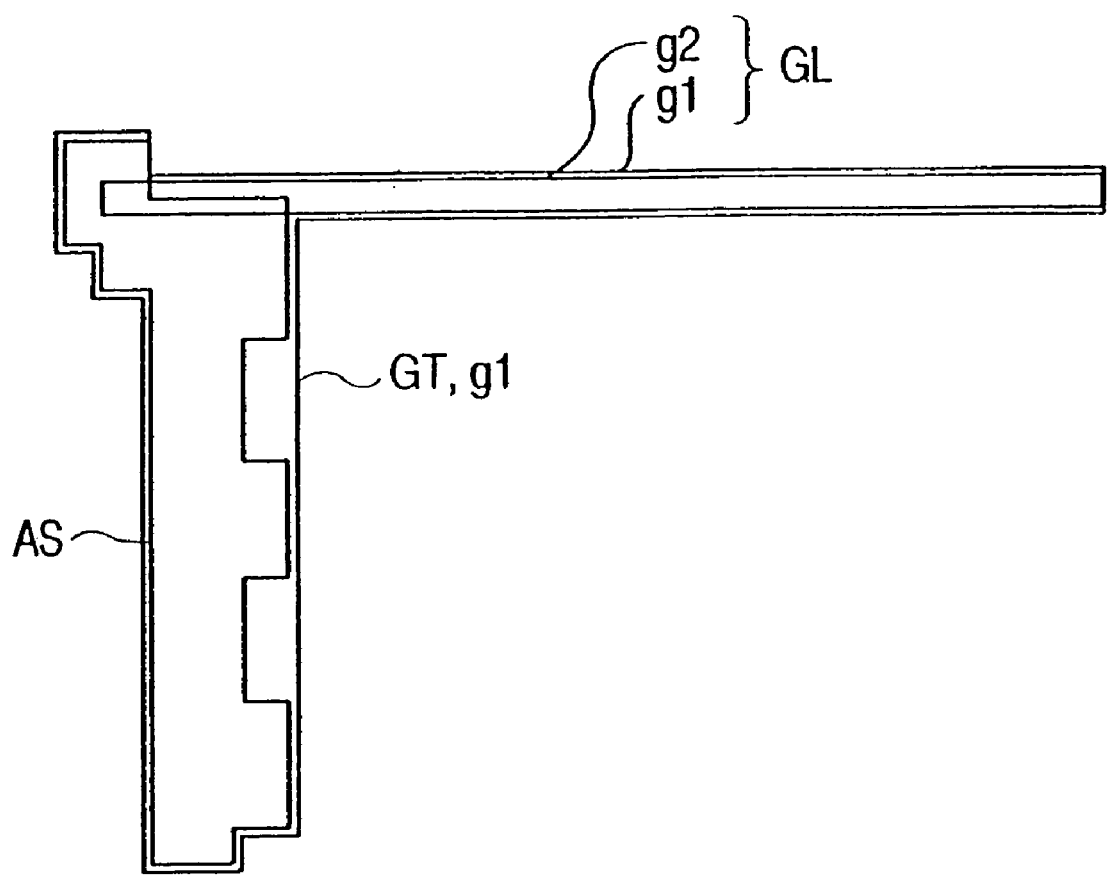

The i-type semiconductor layer AS is, as fully depicted in FIG. 5 (a plan view of the principal portion in a predetermined manufacturing process), employed as a channel forming region of each of the plurality of divided thin film transistors TFT1 to TFT3. The i-type semiconductor layers AS of the plurality of divided thin film transistors TFT1 to TFT3 are formed into one united body within the pixel. Namely, each of the plurality of divided thin film transistors TFT1 to TFT3 of the pixel is formed-in an insular region of one (common) i-type semiconductor layer AS. The i-type semiconductor layer AS is formed of an amorphous silicon film or a polycrystalline silicon film, the thickness of which is approximately 1800 (Å).

The i-type semiconductor layer AS is formed in continuation from the $Si_3N_4$ gate insulating film GI by the same plasma CVD device, changing supply gas components in such a manner that this layer AS is not exposed to the outside from the plasma CVD device. Similarly, do (FIG. 2) and an $N^+$ layer in which p for ohmic contact is doped are successively formed with a thickness of about 400 (Å). Subsequent to this step, the substrate SUB1 is taken out of the CVD device, the $N^+$-layer do and the i-layer AS are subjected to patterning to form independent insular portions shown in FIGS. 1, 2 and 5 by employing a photo-processing technique.

Thus, by virtue of the arrangement that the i-type semiconductor layers AS of the plurality of divided thin film transistors TFT1 to TFT3 of the pixel are formed into one united body, the drain electrode SD2 common to the thin film transistors TFT1 to TFT3 passes over the i-type semiconductor layer AS once (in fact, a step equivalent to the film thickness obtained by totaling the thicknesses of the first conductive layer g1, the $N^+$-type semiconductor layer d0 and the i-type semiconductor layer AS) from the drain electrode SD2 to the i-type semiconductor layer AS. This contributes to a drop in the probability that the drain electrode SD2 is disconnected, which further leads to a decrease in the possibility of causing the point defect. In the embodiment I, the point defect created in the pixel when the drain electrode SD2 goes over the step of i-type semiconductor layer AS can be reduced by a factor of 3.

Though different from the layout of the embodiment I, where the portion of the image signal line DL which has gone directly over the i-type semiconductor layer AS is formed as the drain electrode 2, it is possible to diminish the probability that a linear defect is caused due to the disconnection when the image signal line DL (the drain electrode SD2) goes over the i-type semiconductor layer AS. In other words, the i-type semiconductor layers AS of the plurality of divided thin film transistors TFT1 to TFT3 of the pixel are formed into one united body, whereby the image signal line DL (the drain electrode SD2) goes over the i-type semiconductor layer AS only once (in fact, however, twice—the beginning and the end of such an action).

The i-type semiconductor layer AS, as depicted in detail in FIGS. 1 and 5, extends to the intersection (a crossover) between the scanning signal line GL and the image signal line DL. The thus extended i-type semiconductor layer AS is intended to diminish the degree of short-circuiting between the scanning signal line GL and the image signal line DL at the intersection.

Figure 6:
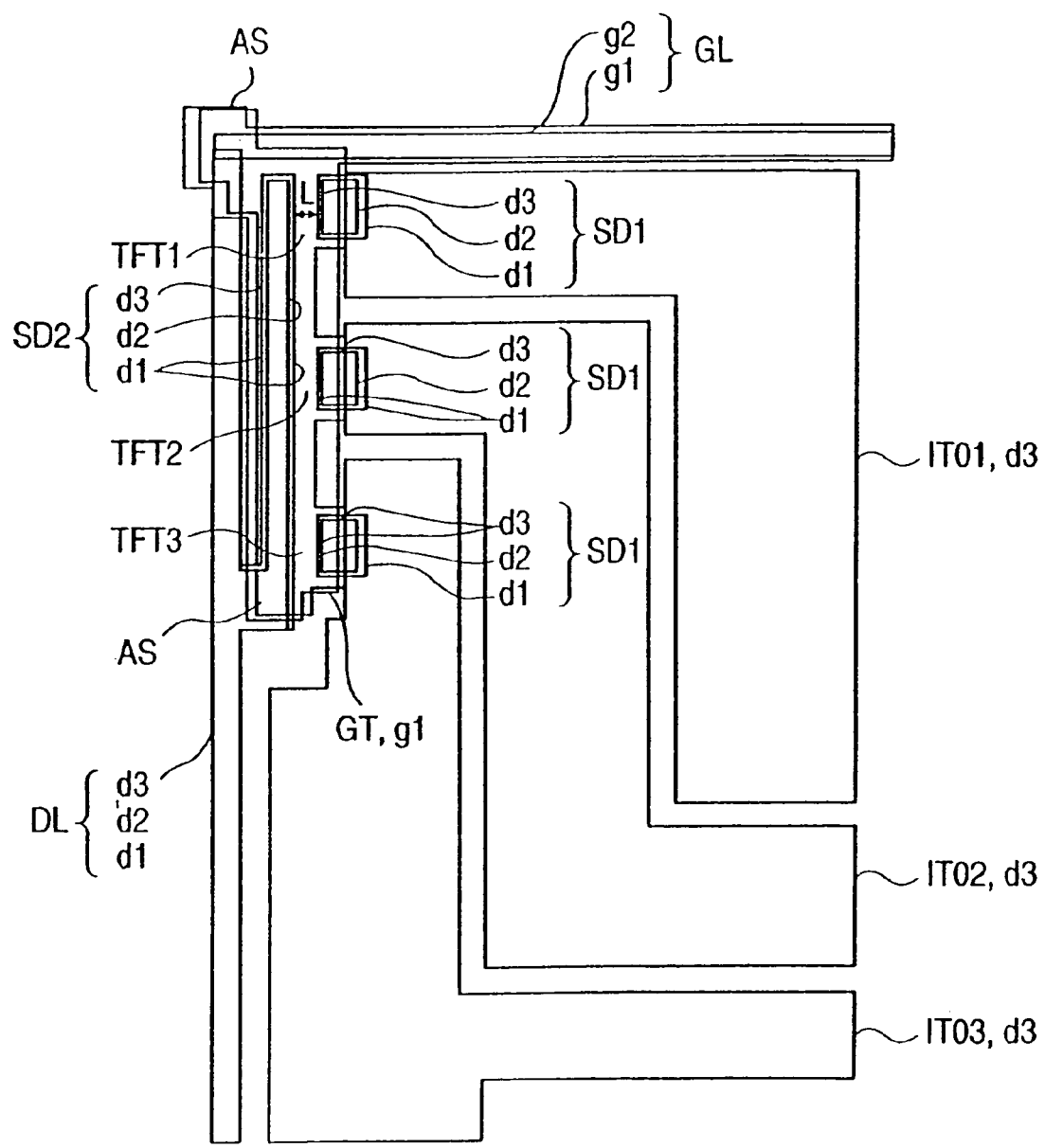

The source electrode SD1 and the drain electrode SD2 of each of the plurality of divided thin film transistors TFT1 through TFT3 of the pixel are, as fully illustrated in FIGS. 1, 2 and 6 (a plan view of the principal portion in the predetermined manufacturing process), so disposed on the i-type semiconductor layer AS as to be spaced away from each other. The source electrode SD1 and the drain electrode SD2 may be interchangeable in terms of operation when the bias polarity of the circuit varies. Namely, as in the case of an FET, the thin film transistor TFT is of a bidirectional type. Each of the source electrode SD1 and the drain electrode SD2 is so arranged that a first conductive film d1, a second conductive film d2 and a third conductive film d3 are sequentially superposed from the lower layer contiguous to the N$^+$-type semiconductor layer d0. The first, second and third conductive films d1, d2 and d3 of the source electrode SD1 are formed in the same process as that of the drain electrode SD2.

The first conductive film d1 is composed of a chromium film shaped by sputtering, the thickness of which is 500 to 1000 (Å) (approximately 600 (Å) in this embodiment). The chromium film has such properties that the stress increases, if the film thickness becomes large. Therefore, the thickness must fall within a range of about 2000 (Å). The chromium film has a favorable contact condition with respect to the N$^+$-type semiconductor layer d0. The chromium film also performs a function to prevent aluminum contained in the second conductive film d2 from diffusing into the N$^+$-type semiconductor layer d0 by forming a so-called barrier layer. In addition to the chromium film, the formation of the first conductive film d1 may involve the use of a high melting point metal (Mo, Ti, Ta and W) film or a high melting point metal silicide (MoSi$_z$, TiSi$_z$, TaSi$_z$ and WSi$_z$) film.

After the patterning has been effected on the first conductive film d1 by the photo-processing, the N$^+$-layer d0 is removed by the same photo-processing mask or with the first conductive film d1 serving as a mask. More specifically, the N$^+$-layer do left on the i-layer AS except for the first conductive film d1 is removed by self-alignment. At this time, the N$^+$-layer d0 is etched so that the portion equivalent to its thickness is all removed, and hence the surface of the i-layer AS is also etched to some extent. The extent to which the surface is etched may be controlled according to the etching time.

Subsequently, the second conductive film d2 is formed of aluminum with a thickness of 3000 to 4000 (Å) (approximately 3000 (Å) in this embodiment) by sputtering. The aluminum film is smaller in stress than the chromium film and can be formed thick. The aluminum film behaves to reduce resistance values of the drain electrode SD2 and the image signal line DL. The second conductive film d2 is arranged to increase the velocities at which the thin film transistor TFT functions and at which the signal of the image signal line DL is transmitted. Namely, the second conductive film d2 is capable of improving the writing characteristic of the pixel. Excepting the aluminum film, the second conductive film d2 may be formed of an aluminum film containing silicon (Si) and copper (Cu) as additives.

After the second conductive film d2 has undergone patterning based on the photo-processing technique, the third conductive film d3 is composed of a transparent conductive film (ITO: a nesa film) having 1000 to 2000 (Å) (approximately 1200 (Å) in this embodiment) in thickness, which requires the sputtering process. The third conductive film d3 constitutes not only the source electrode SD1, the drain electrode SD2 and the image signal line DL but also the transparent pixel electrode ITO.

The first conductive films d1 of the source electrode SD1 and of the drain electrode SD2 are each shaped larger on the side of channel forming region than the upper second conductive film d2 and the third conductive film d3 as well. To be more specific, if there is created some deviation in mask alignment in the manufacturing process between the first, second and third conductive films d1, d2 and d3, the first conductive film d1 is arranged to become larger than the second and third conductive films d2 and d3 (the channel forming regions of the first, second and third conductive films d1, d2 and d3 may be on the line). The first conductive films d1 of the source electrode SD1 and the drain electrode SD2 are each so formed as to prescribe the gate length L of the thin film transistor TFT.

In the plurality of divided thin film transistors TFT1 to TFT3 of the pixel, each of the first conductive films d1 of the source electrode SD1 and the drain electrode SD2 is shaped larger on the side of channel forming region than the second conductive film d2 and the third conductive film d3 as well. This arrangement permits the gate length L of the thin film transistor TFT to be defined by a dimension between the first conductive films d1 of the source electrode SD1 and of the drain electrode SD2. The spacing (the gate length L) between the first conductive films d1 can be prescribed by processing accuracy (patterning accuracy), so that it is feasible to make uniform the gate length L of each of the thin film transistors TFT1 to TFT3.

The source electrode SD1 is, as explained earlier, connected to the transparent pixel electrode ITO. The source electrode SD1 is formed along the stepped portion (the step equivalent to the thickness obtained by totaling the thicknesses of the first conductive film g1, the N$^+$-layer d0 and the i-type semiconductor layer AS) of the i-type semiconductor layer AS. More specifically, the source electrode SD1 consists of: the first conductive film d1 formed along the stepped portion of the i-type semiconductor layer AS; the second conductive film d2 so formed thereon as to be smaller on the connecting-side to the transparent pixel electrode ITO than the first conductive electrode d1; and the third conductive film d3 which is exposed from the second conductive film d2 and is connected to the first conductive electrode d1. The first conductive electrode d1 of the source electrode SD1 has a good bonding property with respect to the N$^+$-type semiconductor layer d0 and is formed chiefly as a barrier layer against diffused matters from the second conductive film d2. The second conductive film d2 of the source electrode SD1 is formed sufficiently dimensioned to extend over the i-type semiconductor layer AS, because the chromium film of the first conductive film d1 cannot be formed too thick due to an increase in stress and is incapable of surmounting the stepped portion of the i-type semiconductor layer AS. That is, the second conductive film d2 is formed thick, thereby improving its step coverage. The second conductive film d2 which can be formed thick contributes greatly to a reduction in resistance value of the source electrode SD1 (this is the same with the drain electrode SD2 as well as with the image signal line DL). The third conductive film d3 is incapable of surmounting the stepped portion associated with the i-type semiconductor layer AS of the second conductive film d2, and it follows that the third conductive film d3 is arranged to make a connection to the exposed first conductive film d1 by reducing the size of the second conductive film d2. The first and third conductive films d1 and d3 each have a favorable bonding property, and the connecting portion therebetween is small. Hence, these two conductive films can be securely connected to each other.

As discussed above, the source electrode SD1 of the thin film transistor TFT is composed of at least the first conductive film d1 serving as the barrier layer formed along the i-type semiconductor layer AS and the second conductive film d2 which is formed on the upper portion of the first conductive film d1 and has a smaller size and a smaller specific resistance value than those of the first conductive film d1. The first conductive film d1 exposed from the second conductive film d2 is connected to the third conductive film d3 defined as the transparent pixel electrode ITO, whereby the thin film transistor TFT can be securely connected to the transparent pixel electrode ITO. It is therefore possible to reduce the point defect due to the disconnection. Besides, the source electrode SD1 may involve the use of the second conductive film d2 (an aluminum film) having a small resistance value by virtue of the barrier effects produced by the first conductive film d1, and this is conducive to a drop in resistance value.

The drain electrode SD2 is so formed as to be integral with the image signal line DL in-the same manufacturing process. The drain electrode SD2 assumes an L-like configuration wherein this electrode SD2 protrudes in such a row-direction as to intersect the image signal line DL. The drain electrode SD2 of each of the plurality of divided thin film transistors TFT1 to TFT3 of the pixel is connected to the same image signal line DL.

The transparent pixel electrode ITO is provided in every pixel and constitutes one of the pixel electrodes of the liquid crystal display unit. The transparent pixel electrode ITO is split into three transparent pixel electrodes (divided transparent pixel electrodes) ITO1, ITO2 and ITO3 corresponding to the plurality of divided thin film transistors TFT1 to TFT3, respectively. The transparent pixel electrode ITO1 is connected to the source electrode SD1 of the thin film transistor TFT1. The transparent pixel electrode ITO2 is connected to the source electrode SD1 of the thin film transistor TFT2. The transparent pixel electrode ITO3 is connected to the source electrode SD1 of the thin film transistor TFT3.

The transparent pixel electrodes ITO1 through ITO3 are, as in the case of the thin film transistors TFT1 through TFT3, virtually of the same size. Each of the transparent pixel electrodes ITO1 through ITO3 is so formed as to be integral with the i-type semiconductor layer AS of each of the thin film transistors TFT1 to TFT3 (the divided thin film transistors TFTs are concentrated on one portion), thus assuming the L-like configuration.

As is obvious from the description given above, the thin film transistor TFT of the pixel disposed in each of the intersection regions defined by the two adjacent scanning signal lines GL and the two adjacent image signal lines DL is split into the plurality of thin film transistors TFT1 to TFT3; and the thus divided thin film transistors TFT1 to TFT3 are connected to the plurality of divided transparent pixel electrodes ITO1 to ITO3. Owing to this arrangement, only part (for instance TFT1) of the divided portions of the pixel would be associated to contributing to the point defect, and hence there is no point defect in a large proportion of the pixel (TFT2 and TFT3 are not associated with the point defect). Consequently, a magnitude of the point defect of the pixel can be reduced on the whole.

The point defect created in part of the divided portions of the pixel is small as compared with the entire area thereof (the point defect is one-third the area of the pixel in this embodiment), whereby it is difficult to visually perceive the point defect.

Each of the divided transparent pixel electrodes ITO1 to ITO3 of the pixel is formed virtually of the same size. A uniform area of the point defect in the pixel can be obtained because of this arrangement.

Because each of the divided transparent pixel electrodes is formed virtually of the same size, it is feasible to make uniform both a liquid crystal capacitor (Cpix) provided by a combination of each of the transparent pixel electrodes ITO1 to ITO3 and the common transparent pixel electrode ITO, and a superposition capacitor (cgs) given by superposition of the transparent pixel electrodes ITO1 to ITO3 on the gate electrodes GT, this superposition capacitance being added to each of the transparent pixel electrodes ITO1 to ITO3. Each of the transparent pixel electrodes ITO1 to ITO3-can make uniform the liquid crystal capacitance and the superposition capacitance, and it is therefore possible to make the DC component uniform which is applied to liquid crystal molecules of the liquid crystal LC due to the superposition capacitance. When adopting a way of offsetting the DC component, scattering in the DC component applied to the liquid crystal of every pixel can be decreased.

Protection films PSV1 are provided on the thin film transistor TFT and the transparent pixel electrode ITO. The protection film PSV1 is formed mainly for protecting the thin film transistor TFT from moisture or the like. The protection film PSV1 should have high transparency and high moisture-resistant properties. The protection film PSV1 is composed of, e.g., a silicon nitride film or a silicon oxide film formed by the plasma CVD, in which case the film thickness is approximately 8000 (Å). A light shielding film LS is disposed on the protection film PSV1 on the thin film transistor TFT, with the result that the light emerging from the outside does not strike upon the i-type semiconductor layer AS serving as a channel forming region. The light shielding film LS is, as depicted in FIG. 1, disposed in the region surrounded by a dotted line. Based on sputtering, the light shielding film LS is formed of, e.g., an aluminum film or a chromium film having high light shielding properties, the thickness of which is about 1000 (Å).

Therefore, it follows that the common semiconductor layer AS to the thin film transistors TFT1 through TFT3 is sandwiched in between the relatively large gate electrode GT and the light shielding films LS provided up and down so as not to be irradiated with the outside natural light or the beams-of backlight. The light shielding film LS and the gate electrode GT are formed in a substantially similar configuration to the semiconductor layer AS, but are larger than this semiconductor layer AS. The light shielding film LS and the gate electrode GT are almost equal in size (the gate electrode GT is depicted smaller than the light shielding film LS to make the border line clear in the Figure).

Note that a backlight lamp may be installed on the side of the substrate SUB2, while the substrate SUB1 is provided as an observation side (an outside exposing side). In this case, the light shielding film LS functions as a light shielding member against the backlight, while the gate electrode GT behaves as a light shielding member against the natural light.

The thin film transistor TFT is arranged such that when applying a positive bias to the gate electrode GT, a channel resistance between the source and the drain decreases, and if the bias becomes zero, the channel resistance increases. The thin film transistor TFT serves to control a voltage impressed on the transparent pixel electrode ITO.

The liquid crystal LC is sealed in an air space formed between the lower transparent glass substrate SUB1 and the upper transparent glass substrate SUB2, the liquid crystal being prescribed by a lower orientation film OR11 and an upper orientation film OR12 for orienting liquid crystal molecules.

The lower orientation film OR11 is formed on the upper portion of the protection film PSV1 provided on the side of the lower transparent glass substrate SUB1.

Sequentially laminated on the inside (on the side of liquid crystal) surface of the upper transparent glass substrate SUB2 are a color filter FIL, the protection film PSV2, the common transparent pixel electrode (COM) ITO and the upper orientation film OR12.

The common transparent pixel electrode-ITO stands vis-a-vis with the transparent pixel electrode ITO provided in every pixel on the side of the lower transparent glass substrate SUB1, and cooperates with another adjacent common transparent pixel ITO to form one united body. This common transparent pixel electrode ITO is allowed to undergo impression of a common voltage Vcom. The common voltage Vcom is defined as an intermediate electric potential between a low level driving voltage Vdmin and a high level driving voltage Vdmax which are impressed on the image signal line DL.

The color filter FIL is formed in such a manner that a dyeing base member formed of resin, e.g., acrylic resin is stained with dyestuffs. For every pixel, the color filter FIL is disposed in a position standing vis-a-vis with the pixel. The color filters FIL are allocated according to the dyeing. Namely, as in the case of a pixel, each individual color filter FIL is disposed in the intersection region defined by the two scanning signal lines GL and the two image signal lines DL. Each pixel is split into a plurality of segments in a filter of a predetermined color of the color filter FIL.

The color filter FIL may be arranged in the following manner. The arrangement begins with formation of the dyeing base member on the surface of the upper transparent glass substrate SUB2. Excepting a red color filter forming region, the dyeing base member is then partly removed by the photolithography. Subsequent to this step, the dyeing base member is stained with a red dyestuff and is subjected to a bonding process, thus forming a red filter R. Next, a green filter G and a blue filter B are sequentially formed by performing the same processes.

The respective color filters of the color filter FIL are formed in the intersection regions so that these filters face the individual pixels. The scanning signal lines GL and the image signal lines DL each exist between the respective color filters of the color filter FIL. Therefore, a space allowance, which corresponds to the presence of each signal line, for positioning can be ensured (a positioning margin can be enlarged). Moreover, when forming the individual color filters of the color filter FIL, a positioning space allowance between the different color filters can also be ensured.

In accordance with this embodiment, the pixels are formed in the intersection regions defined by the two scanning signal lines GL and the two image signal lines DL. Each pixel is split into a plurality of segments, and the respective color filters of the color filter FIL are formed in such positions standing vis-a-vis with the thus divided pixels. In this constitution, the above-described point defect can be diminished in magnitude, and at the same time it is feasible to ensure the space allowance for positioning the respective pixels and the color filters.

The protection film PSV2 is designed for preventing the dyestuffs with which the color filter FIL is differently stained from permeating into the liquid crystal LC. The protection film PSV2 is formed of, for example, transparent resinous material such as acrylic resin, epoxy resin and so on.

The assembly of this liquid crystal display device involves the steps of separately forming layers on the side of lower transparent glass substrate SUB1 and the upper transparent glass substrate SUB2, superposing the lower and upper transparent glass substrates SUB1 and SUB2 on each other, and sealing the liquid crystal LC therebetween.

The plurality of pixels on the liquid crystal display unit are, as depicted in FIG. 3, arranged in the same row-direction as the direction in which the scanning signal lines GL extend, thus constituting pixel rows $X_1, X_2, X_3, X_4 \ldots$ In each pixel of the pixel rows $X_1, X_2, X_3, X_4 \ldots$, the positions in which the thin film transistors TFT1 to TFT3 and the transparent pixel electrodes ITO1 to ITO3 are disposed are the same. To be more specific, in each pixel of the pixel rows $X_1, X_3 \ldots$, the positions in which the thin film transistors TFT1 through TFT3 are disposed are set to the left, whereas the positions in which the transparent pixel electrodes ITO1 through ITO3 are disposed are set to the right. The individual pixels of the pixel rows $X_2, X_4, \ldots$ that are positioned at the stage subsequent to the pixel rows $X_1, X_3, \ldots$ in the column-direction and the pixel of the pixel rows $X_1, X_3, \ldots$ each exhibit a linear symmetry with respect to image signal line DL. In each pixel of the pixel rows $X_2, X_4, \ldots$, the thin film transistors TFT1 to TFT3 are disposed on the right side, whereas the transparent pixel electrodes ITO1 to ITO3 are disposed on the left side. The pixels of the picture element rows $X_2, X_4, \ldots$ are each placed to shift (deviate) a distance equivalent to half of a pixel in the row-direction with respect to the pixels of the pixel rows $X_1, X_3, \ldots$ Supposing that the intervals between the pixels of the pixel row X are all set to 1.0 (1.0 pitch), the pixel interval is 1.0 in the next pixel row X, and hence the pixels deviate from those of the previous pixel row X with a 0.5 pixel interval (0.5 pitch) in the row-direction. The image signal lines DL disposed between the pixels and arrayed in the row-direction are such that each extends a distance equivalent to half of a pixel in the row-direction between the pixel rows.

Figure 7:
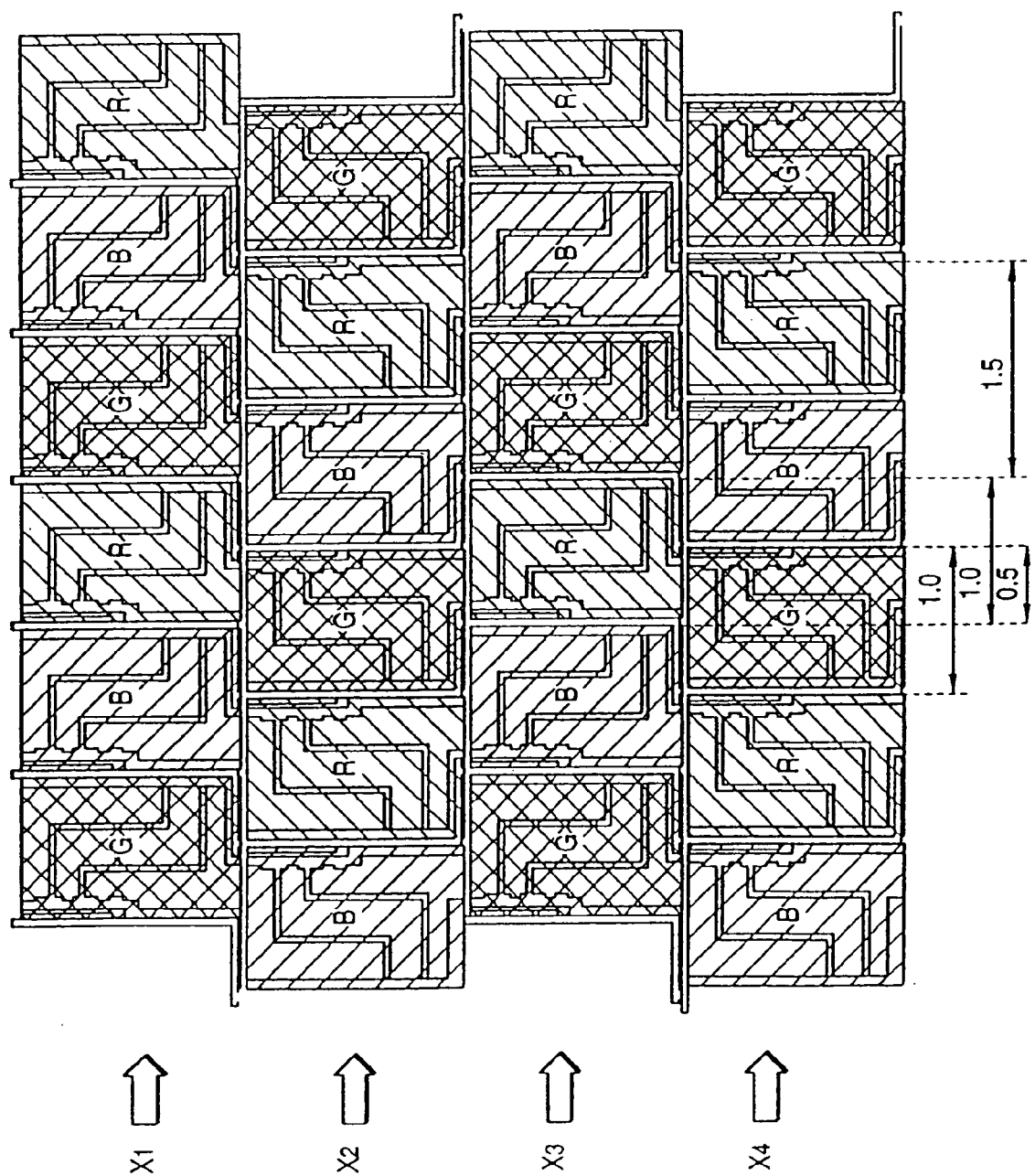
FIG. 7 is a plan view illustrating the principal portion in a state where color filters are superposed on the pixels depicted in FIG. 3.

As discussed above, in the liquid crystal unit, the plurality of pixels in which the thin film transistor TFT and the transparent pixel electrode ITO are disposed respectively in the same positions are arranged in the row-direction, thus constituting the pixel row X. The pixels of the next pixel row X and the pixels of the preceding pixel row are linearly symmetric with respect to the image signal line DL. The pixels of the next pixel row are disposed to shift a distance in the row-direction equivalent to half of a pixel with respect to the pixels of the previous pixel row. As illustrated in FIG. 7 (a plan view of the principal portion in a state where the pixels and the color filters are superposed on each other), it is therefore possible to provide a 1.5 pixel interval (1.5 pitch) between each of the pixels of the previous pixel row X in which predetermined color filters are formed (for instance, the pixels of the pixel row $X_3$ in which the red filters are formed) and each of the pixels of the next pixel row X in which the same color filters are formed (for example, the pixels of the pixel row $X_4$ in which the red filters are formed). The pixels of the pixel row X of the previous pixel row X are disposed invariably at the 1.5 picture element intervals from the pixels of the closest next pixel row in which the same color filters are formed. The color filter FIL is allowed to take a triangular arrangement of RGB. This triangular arrangement of RGB of the color filter FIL is capable of enhancing conditions under which the respective colors are mixed. Hence, a resolution of color image can be improved.

Between the pixel rows X, the image signal line DL extends a distance half of a pixel in the row-direction, whereby this image signal line DL does not intersect the adjacent image signal line DL. This eliminates the necessity of leading round the image signal line DL, resulting in a decrease in occupied area thereof. It is therefore feasible to eliminate both a detour of the image signal line DL and the multilayered wiring structure.

Figure 9:
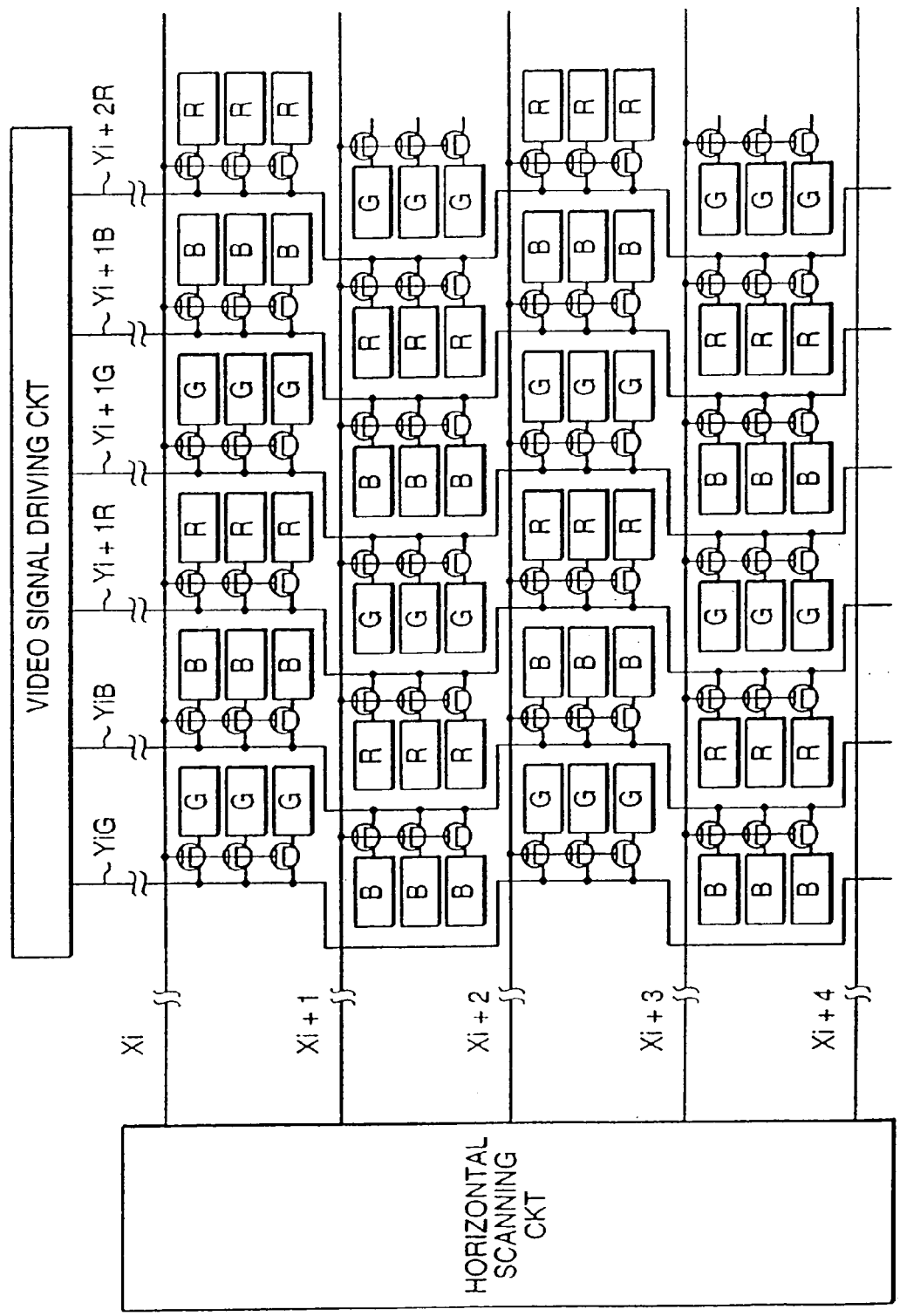
FIG. 9 is an equivalent circuit diagram showing the liquid crystal display unit of the active matrix color liquid crystal display device in which the embodiments I and II of the present invention are incorporated.

Directing attention to FIG. 9 (an equivalent circuit diagram of the liquid crystal display unit), there is illustrated a construction of a circuit of the liquid crystal display. In FIG. 9, the symbols YiG, Yi+1G, . . . indicate the image signal lines DL connected to the pixels in which green filters G are formed. The symbols YiB, Yi+1B, . . . represent the image signal lines DL connected to the pixels in which the blue filters B are formed. The symbols Yi+1R, Yi+2R, . . . denote the image signal lines DL connected to the pixels in which the red filters R are formed. These image signal lines DL are selected by an image signal driving circuit. The symbol Xi denotes the scanning signal line GL for selecting the pixel row $X_1$ depicted in FIGS. 3 and 7. Similarly, the symbols Xi+1, Xi+2, . . . indicate the scanning signal lines GL for selecting the pixel rows $X_2$, $X_3$, . . . . These scanning signal lines GL are connected to a horizontal scanning circuit. Referring to FIG. 2, the central part thereof illustrates one pixel in section; the left part thereof illustrates a section, in which the outside extension wire is provided, of the left fringes of the transparent glass substrates SUB1 and SUB2; and the right part thereof illustrates a section, in which no outside extension wire is provided, of the right fringes of the transparent glass substrates SUB1 and SUB2.

Sealing materials SL shown on the right and left sides of FIG. 2 are designed for sealing the liquid crystal LC. The sealing materials SL are provided along the entire fringes of the transparent glass substrates SUB1 and SUB2 except for a liquid crystal sealing port (not illustrated). The sealing material SL is formed of, e.g., epoxy resin.

The common transparent pixel electrode ITO on the side of the upper transparent glass substrate SUB2 is connected leastwise at one portion to the outside extension wire formed of a silver paste material SIL on the side of the lower transparent glass substrate SUB1. The outside extension wire is formed in the same process as those of the gate electrode GT, the source electrode SD1 and the drain electrode SD2.

Formed inside the sealing materials SL are layers of the orientation films OR11 and OR12, the transparent pixel electrode ITO, the common transparent pixel electrode ITO, the protection films PSV1 and PSV2 and the insulating film GI. Polarization plates POL are placed on the outer surfaces of the lower and upper transparent glass substrates SUB1 and SUB2.

Embodiment II

The embodiment II of the present invention is characterized by the following points: an opening rate of each pixel on the liquid crystal display unit of the liquid crystal display device is improved; and the point defect and the black scattering of the liquid crystal display unit are reduced by decreasing the DC component applied to the liquid crystals.

Figure 8:
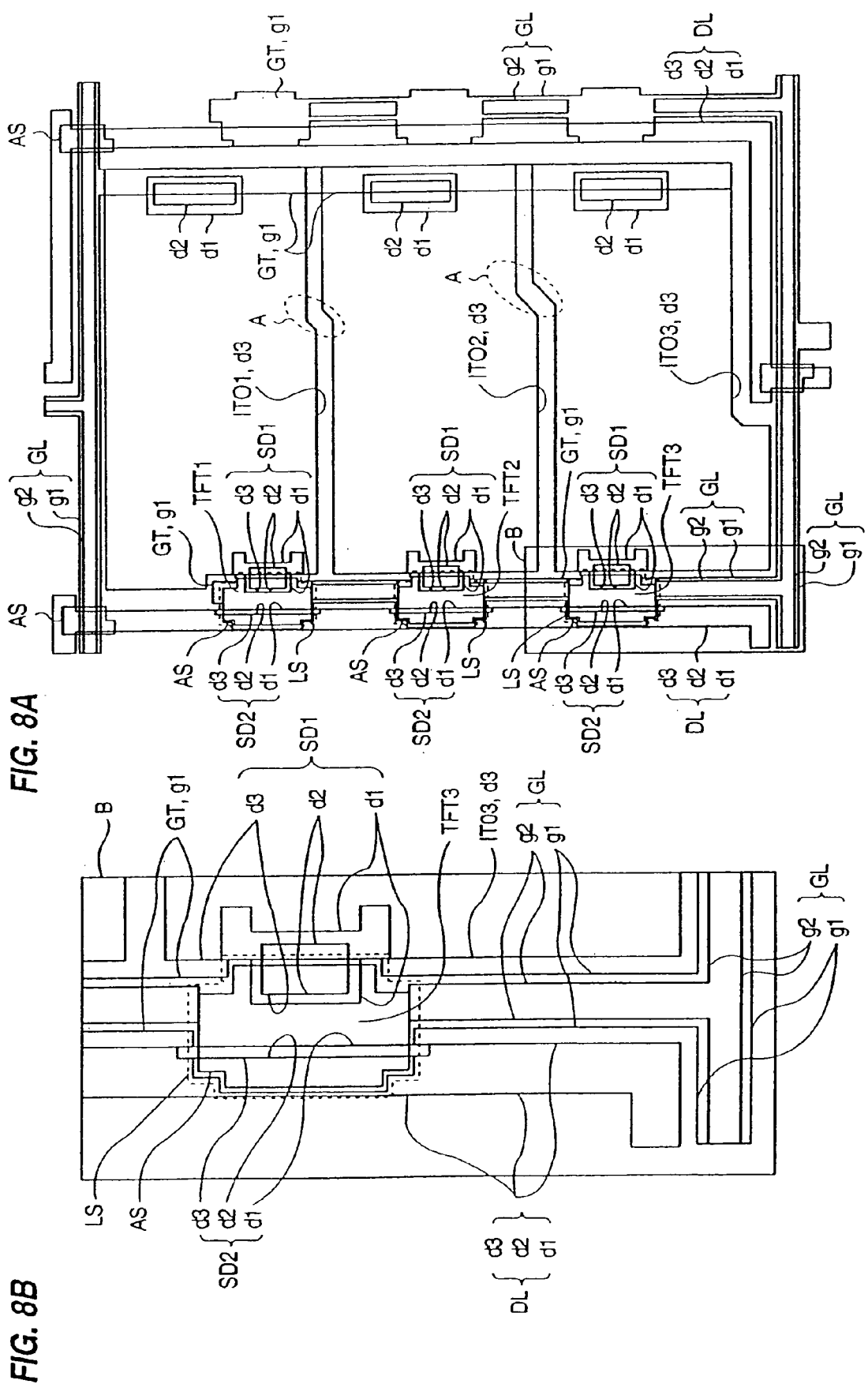
FIG. 8A is a plan view illustrating the principal portion of one pixel on the liquid crystal display unit of the active matrix color liquid crystal display device in which an embodiment II of the present invention is incorporated.
FIG. 8B is a partially enlarged view thereof.

FIG. 8A (a plan view of the principal portion) illustrates one pixel on the liquid crystal display unit of the liquid crystal display device in which the embodiment II of the present invention is incorporated. FIG. 8B is a view enlarged three times as large as the portion (TFT3 and its. peripheral portion), shown in FIG. 8A, surrounded by a bold solid frame line B on the lower left side in the Figure.

The liquid crystal display device of the embodiment II is arranged in such a way that the i-type semiconductor layer As in each individual pixel on the liquid crystal display unit is, as illustrated in FIGS. 8A and 8B, provided for each of the thin film transistors TFT1 through TFT3. Namely, each of the plurality of divided thin film transistors TFT1 through TFT3 is formed in an independent insular region of the i-type semiconductor layer AS.

In the thus constituted pixel, the thin film transistors TFT1 to TFT3 can be equally allocated in the column-direction in which the image signal lines DL extend. Consequently, it is feasible to shape each of the transparent pixel electrodes ITO1 to ITO3 in a rectangular configuration and to connect them, respectively, to the thin film transistors TFT1 to TFT3. The transparent pixel electrodes ITO1 to ITO3 (each assuming the rectangular configuration) serve to reduce an area of space (an area corresponding to the region indicated by the oblique line shown in FIG. 8A is diminished) in the column-direction between the continuous transparent pixel electrode ITO within the pixel. As a result, the improvement can be obtained in regard to the area (an opening rate).

As encircled by a dotted line marked with the symbol A, in FIG. 8A, a variation in configuration of each of the transparent pixel electrodes ITO1 to ITO3 is made by using a line inclined at a certain angle to the scanning signal line GL or the image signal line DL (for example, a line inclined at an angle of 45°). Each of the transparent pixel electrodes ITO1 to ITO3 is capable of reducing the area of space between the transparent pixel electrodes ITO as compared with a case where the configuration is varied by a line orthogonal to or parallel with the scanning signal line GL or the image signal line DL. Hence, the opening rate can be improved.

Each of the transparent pixel electrodes ITO1 to ITO3 is superposed on the scanning signal line GL of the next stage in the column-direction both on the side connected to the thin film transistor TFT and on the side opposite thereto. As in the case of the gate electrode GT of the respective thin film transistors TFT1 to TFT3, this superposition is effected by causing the scanning signal line GL of the next stage to branch off in a T-like shape, which is contiguous to the scanning signal line GL (the scanning signal line GL for selecting the pixel) for selecting its gate electrode GT. The thus diverged scanning signal line GL is, as in the case of the gate electrode of the thin film transistor TFT, composed of a single layer of the first conductive film (chromium film) g1. By virtue of the above-described superposition, there is constituted a holding capacitance element (an electrostatic capacitance element) Cadd wherein each of the transparent pixel electrodes ITO1 to ITO3 is employed as one electrode, and the portion diverged from the scanning signal line of the next stage which serves as a capacitor electrode line is used as the other electrode. A dielectric film of the holding capacitance element Cadd is formed of the same layer as that of the insulating film used as a gate insulating film of the thin film transistor TFT.

As in the embodiment I, the gate electrode GT is formed larger than the semiconductor layer AS. In this embodiment, however, the thin film transistors TFT1 to TFT3 are formed for every semiconductor layer AS, and hence a relatively large pattern is formed per thin film transistor TFT. Simultaneously, a connection to the diverged gate wire GL (g1) is made.

Figure 10:
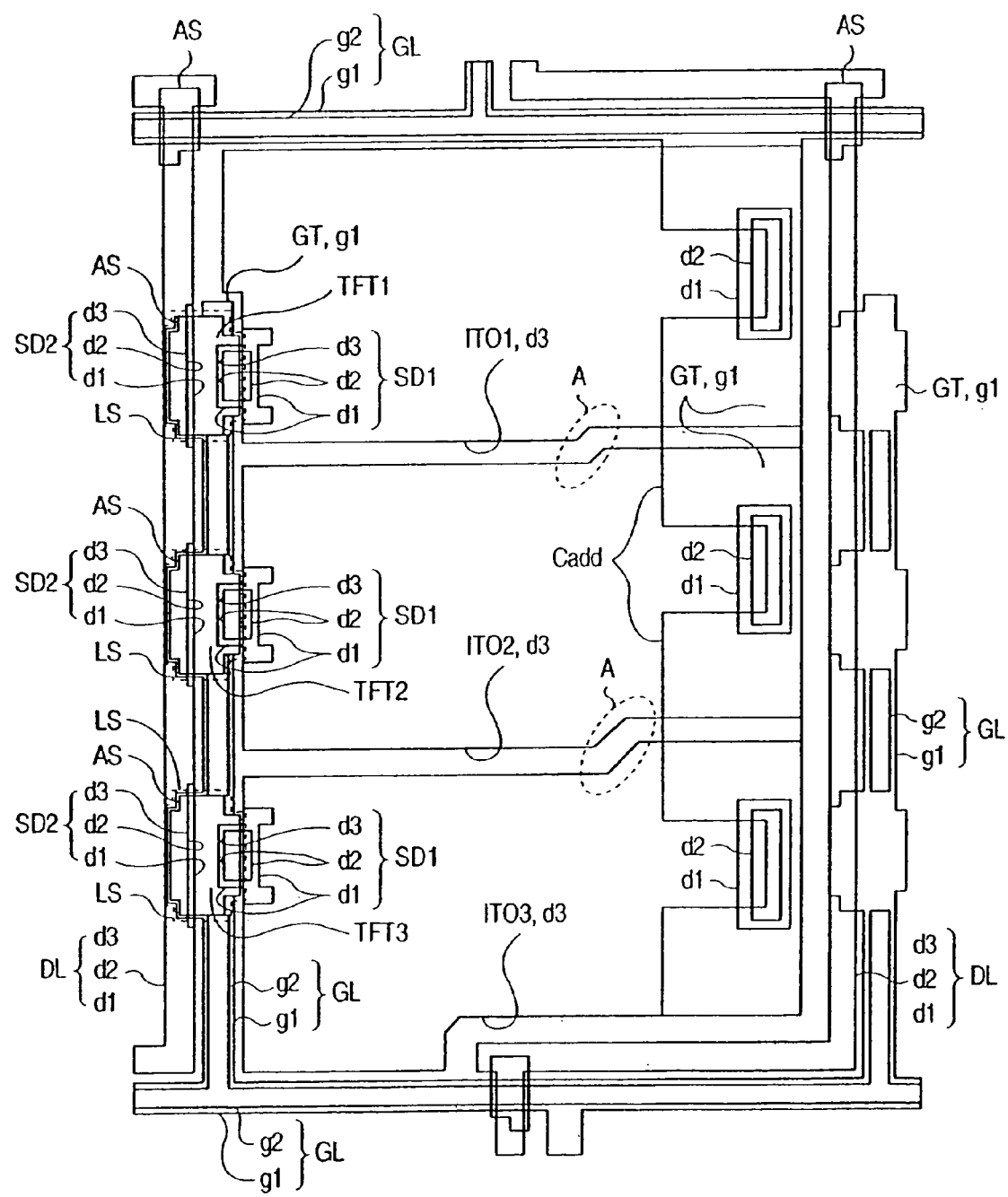
FIG. 10 is a plan view illustrating the principal portion of one pixel in a layout somewhat modified from that of the pixel depicted in FIG. 8.
Figure 11:
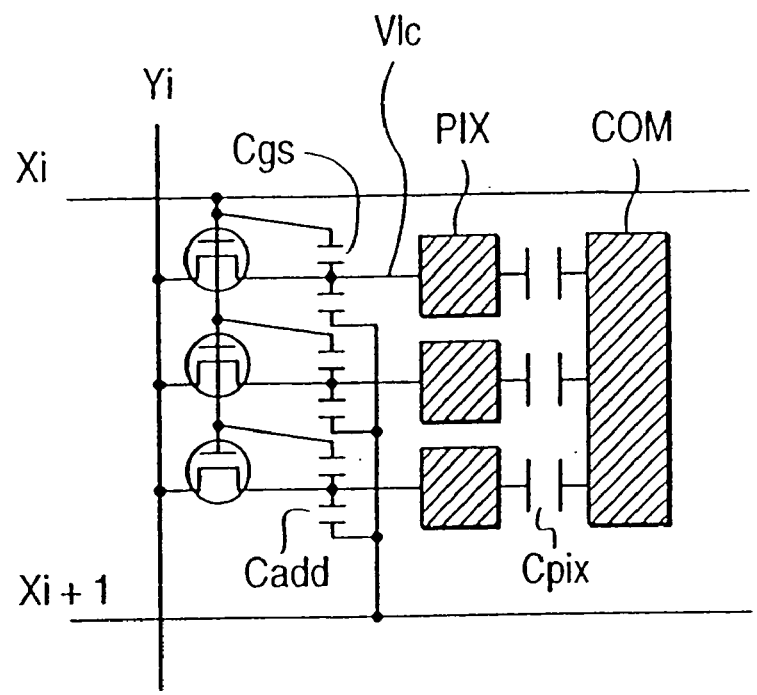
FIG. 11 is an equivalent circuit diagram of the pixel depicted in FIGS. 8 and 10, respectively.

FIG. 10 (a plan view illustrating the principal portion of one pixel in another example) shows another layout of the holding capacitance element Cadd. Referring to FIG. 11 (an equivalent circuit diagram), there is depicted an equivalent circuit of the pixel shown in FIGS. 8 and 10. The holding capacitance element Cadd depicted in FIG. 10 exhibits an increment in the holding capacitance by an enhancing of the superposition of each of the transparent pixel electrodes ITO1 to ITO3 on the diverged portion (the other electrode of the holding capacitance element Cadd) of the capacitance electrode line. Fundamentally, the holding capacity element Cadd shown in FIG. 10 is identical with the holding capacitance element Cadd illustrated in FIG. 8. In FIG. 11, as in the previous case, the symbol Cgs represents the amount of superposition associated with the source electrode SD1 and the gate electrode GT of the thin film transistor TFT. The dielectric film of the superposition quantity Cgs is defined as the insulating film GI. The symbol Cpix designates a liquid crystal capacitor provided between the transparent pixel electrode ITO (PIX) and the common transparent pixel electrode ITO (COM). The dielectric film of the liquid crystal capacitor Cpix includes the liquid crystal LC, the protection film PSV1 and the orientation films OR11 and OR12. The symbol V1c denotes a mid-point potential.

The holding capacitance element Cadd behaves to reduce the influence of a gate potential variation Δvg on the midpoint potential (a pixel electrode potential) V1c. This will be expressed by the following formula:

$$\Delta V1c = (Cgs/(Cgs+Cadd+Cpix)) \times \Delta vg$$

where ΔV1c is the amount of variation in the mid-point potential due to Δvg. This variation quantity ΔV1c is the cause of the DC component applied to the liquid crystal. A value of the variation quantity can be reduced as the holding capacitor Cadd is increased. The holding capacitance Cadd also has a function to increase the time of electric discharge, whereby the image information after turning OFF the thin film transistor is unaltered. The reduction in the DC component applied to the liquid crystal LC permits both improvement of life span of the liquid crystal LC and diminution in so-called seizing wherein the preceding image still subsists when changing over the liquid crystal display picture.

As discussed in the embodiment I, the gate electrode GT is large enough to completely cover the semiconductor layer AS, and the area of overlap of the source electrode SD1 with the drain electrode SD2 increases correspondingly. Hence, a reverse effect is yielded in which the parasitic capacitor Cgs increases, and the mid-point potential V1c tends to be adversely influenced by the gate (scanning) signal Vg. This negative influence can, however, be obviated by providing the holding capacitor Cadd.

In the liquid crystal display device including the pixels disposed in the intersection regions defined by the two scanning signal lines GL and by the two image signal lines DL, the thin film transistor TFT of the pixel selected by any one of the two scanning signal lines is split into a plurality of segments. The thus divided thin film transistors TFT1 through TFT3 are connected to the plurality of transparent pixel electrodes (ITO1 through ITO3) in which the transparent pixel electrode ITO is split. Formed for each of the thus divided transparent pixel electrodes ITO1 through ITO3 is the holding capacitance element Cadd in which the pixel electrode ITO serves as one electrode, and the other scanning signal line GL of the two scanning signal lines, which is defined as the capacitance electrode line, serves as the other electrode. In this arrangement, as explained earlier, only part of the divided portions of the pixel becomes the point defect, and hence no point defect is caused in a large proportion of the pixel. It is therefore possible to reduce the magnitudes of the point defect and the DC component applied to the liquid crystal due to the holding capacitance element Cadd. This further leads to the improvement in the life span of the liquid crystal LC. Especially, the division of pixel contributes to a reduction in magnitude of the point defect caused from a short-circuit between the source electrode SD1 or the drain electrode SD2 and the gate electrode GT of the thin film transistor TFT. In addition, it is feasible to diminish the point defect which would be attributed to a short-circuit between each of the transparent pixel electrodes ITO1 to ITO3 and the other electrode (the capacitance electrode line) of the holding capacitance element Cadd. The latter point defect is decreased in magnitude by a factor of 3 in this embodiment. As a result, the point defect produced in part of the divided portions of the pixel is smaller than the entire area of the pixel, whereby the point defect is hard to be seen.

The holding capacity of the holding capacitance element Cadd is set to a value which is 4 to 8 times the liquid crystal capacitor Cpix (4.Cpix<Cadd<8.Cpix) and 8 to 32 times the superposition capacitor Cgs (8.Cgs<Cadd<32.Cgs).

The scanning signal line GL is composed of the composite layer obtained by superposing the second conductive film (aluminum film) g2 on the first conductive film (chromium film) g1. The other electrode of the holding capacitance element Cadd, viz., the diverged portion of the capacitance electrode line, is formed of the single layer film consisting of a single layer of the first conductive film 9 of the composite film. Consequently, this arrangement is capable of decreasing the resistance value of the scanning signal line GL and enhancing the writing characteristic. Moreover, one electrode (transparent pixel electrode ITO) of the holding capacitance element Cadd can securely be bonded to the upper portion of the insulating film GI along the stepped portion based on the other electrode of the holding capacitance element, thereby reducing the probability that one electrode of the holding capacitance element Cadd is to be disconnected.

The other electrode of the holding capacitance element Cadd is constituted by a single layer of the first conductive film g1, but the second conductive film g2 defined as the aluminum film is not formed. By virtue of this arrangement, it is possible to prevent the short-circuit, which is due to the hillock of the aluminum film, between one electrode and the other electrode of the holding capacitance element Cadd.

Formed between each of the transparent pixel electrodes ITO1 to ITO3 which are superposed to constitute the holding capacitance element Cadd and the diverged portion of the capacitance electrode line is an insular region composed of the first conductive film d1 and the second conductive film d2 as in the case of the source electrode SD1, with the result that the transparent pixel electrode ITO is not disconnected when surmounting the stepped portion of the diverged portion. This insular region is shaped as small as possible so as not to diminish the area (opening rate) of the transparent pixel electrode ITO.

Disposed between one electrode of the holding capacitance element Cadd and the insulating film GI employed as a dielectric film thereof is a base layer consisting of the first conductive film d1 and the second conductive film d2 formed on this first conductive film d1, this second conductive film d2 having a smaller size and a smaller specific resistance value than those of the first conductive film d1. One electrode (a third conductive film d3) is connected to the first conductive film d1 exposed from the second conductive film d2 of the above-mentioned base layer, thereby making it possible to securely bond one electrode of the holding capacitance element Cadd along the stepped portion caused by the other electrode of the holding capacitance element Cadd. Therefore, the probability of an internal disconnection at the stepped portion of one electrode of the holding capacitance element Cadd can be reduced.

Figure 13:
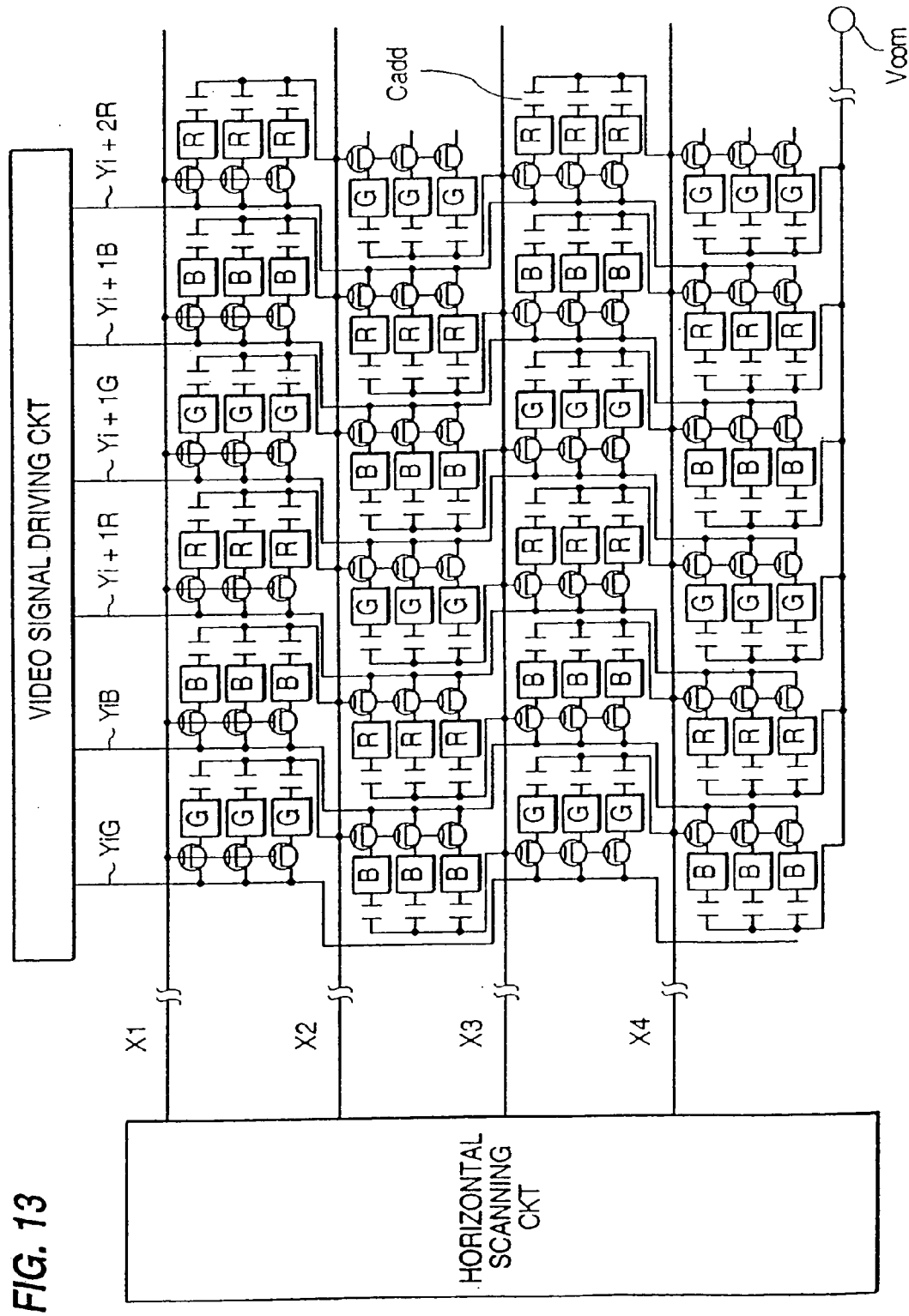
FIGS. 13 and 14 are equivalent circuit diagrams each illustrating the liquid crystal display unit of the active matrix color liquid crystal display device in which the embodiment II of the present invention is incorporated.

FIG. 13 (an equivalent circuit diagram showing the liquid crystal display unit) illustrates a construction of the liquid crystal display unit of the liquid crystal display device in which the transparent pixel electrode ITO of the pixel is provided with the holding capacitance element. The construction of the liquid crystal display unit is based on repetitions of a unit fundamental pattern including the pixel, the scanning signal line GL and the image signal line DL. The scanning signal line GL of the final stage (or the scanning signal line of the first stage) used as a capacitance electrode line is, as depicted in FIG. 13, connected to the common transparent pixel electrode (Vcom) ITO. The common transparent pixel electrode ITO is, as illustrated in FIG. 2, connected to the outside extension wire through the silver paste material SIL on the fringe of the liquid crystal display device. Besides, some conductive layers (g1 and g2) of the outside extension wire are formed in the same manufacturing process as that of the scanning signal line GL. As a result, this facilitates a connection between the scanning signal line GL (capacitance electrode line) of the final stage and the common transparent pixel electrode ITO.

As explained earlier, since the capacitance electrode line of the final stage is connected to the common transparent pixel electrode (Vcom) ITO of the pixel, the capacitance electrode line of the final stage can be so formed as to be integral with part of the conductive layers of the outside extension wire. Furthermore, the common transparent pixel electrode ITO is connected to the outside extension wire, and the capacitance electrode line of the final stage is thereby connected to the common transparent pixel electrode ITO with a simple arrangement.

Figure 12:
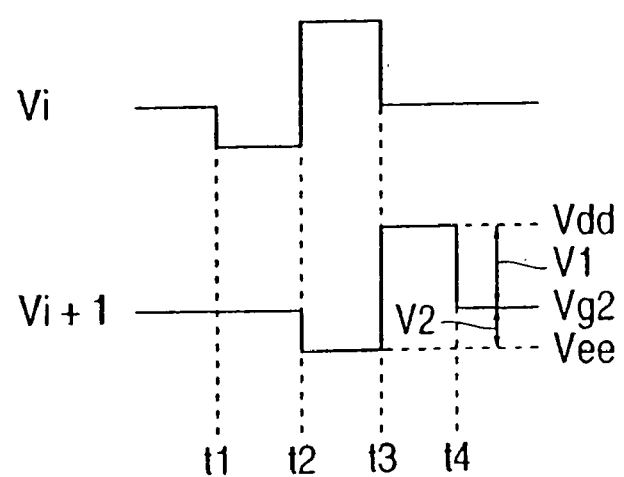
FIG. 12 is a time chart showing a driving voltage of a scanning signal line based on a DC offset system.

Based on the DC offset system (DC cancel system) disclosed in Japanese Patent Application No. 62-95125 for which the present inventors applied on Apr. 20, 1987, corresponding to U.S. Pat. No. 4,955,697, the liquid crystal display device is capable of reducing the DC component applied to the liquid crystal LC, as shown in FIG. 12 (a time chart), by controlling the driving voltage of the scanning signal line DL. Referring to FIG. 12, the symbol Vi represents a driving voltage of an arbitrary scanning signal line GL, and Vi+1 designates a driving voltage of the scanning signal line GL of the next stage. The symbol Vee indicates a driving voltage Vdmin which assumes a low level is impressed on the scanning signal line GL, and Vdd indicates a driving voltage Vdmax which assumes a high level is impressed on the scanning signal line GL. Voltage variation quantities $V_1$ to $V_4$ of the mid-point potential (see FIG. 11) at the respective timings $t=t_1$ to $t_4$ are given such as:

$t=t_1: \Delta V1=-(Cgs/C) \cdot V2$ $t=t_2: \Delta V2=+(Cgs/C) \cdot (V1+V2)-(Cadd/C) \cdot V2$ $t=t_3: \Delta V3=-(Cgs/C) \cdot (V1+Cadd/C) \cdot (V1+V2)$ $t=t_4: \Delta V4=-(Cadd/C) \cdot V1$ However, a total pixel capacitance: $C=Cgs+Cpix+Cadd$.

If a sufficient driving voltage impressed on the scanning signal line GL is provided (see "Notes" given below), the DC voltage applied to the liquid crystal LC is expressed such as:

$\Delta V3+V4=(Cadd \cdot V2-Cgs \cdot V1)/C$, hence, $Cadd \cdot V2=Cgs \cdot V1=0$ Then, the DC voltage applied to the liquid crystal LC comes to zero.

"Notes": A variation quantity of a scanning line Vi exerts an influence on the mid-point potential V1c at the timings $t_1$ and $t_2$. However, the mid-point potential V1c becomes equal to the image signal potential through a signal line Xi during a period of $t_2$ to $t_3$ (sufficient writing of the image signal). The potential applied to the liquid crystal is substantially contingent upon a potential immediately after turning OFF the thin film transistor TFT (a TFT OFF-period is sufficiently longer than a TFT ON-period). Therefore, when calculating the DC component applied to the liquid crystal, a period of $t_1$ to $t_3$ may be almost ignored, and what should be considered here is the potential just after the thin film transistor TFT has been turned OFF, i.e., the influence produced at the transition between the timings $t_3$ and $t_4$. It is to be noted that the polarity of the image signal Vi is inverted per frame or per line, and the DC component associated with the image signal itself is zero.

Based on the DC offset system, an amount of decrease caused by the lead-in of the mid-point potential V1c due to the superposition capacitor Cgs is made to rise by the driving voltage impressed on the scanning signal line GL (capacitance electrode line) of the next stage as well as on the holding capacitance element Cadd, and the DC component applied to the liquid crystal LC can be minimized. This permits the liquid crystal display device to improve the life span of the liquid crystal LC. As a matter of course, where the gate GT increases in configuration to enhance the light shielding effects, a value of the holding capacitor Cadd may be incremented correspondingly.

Figure 14:
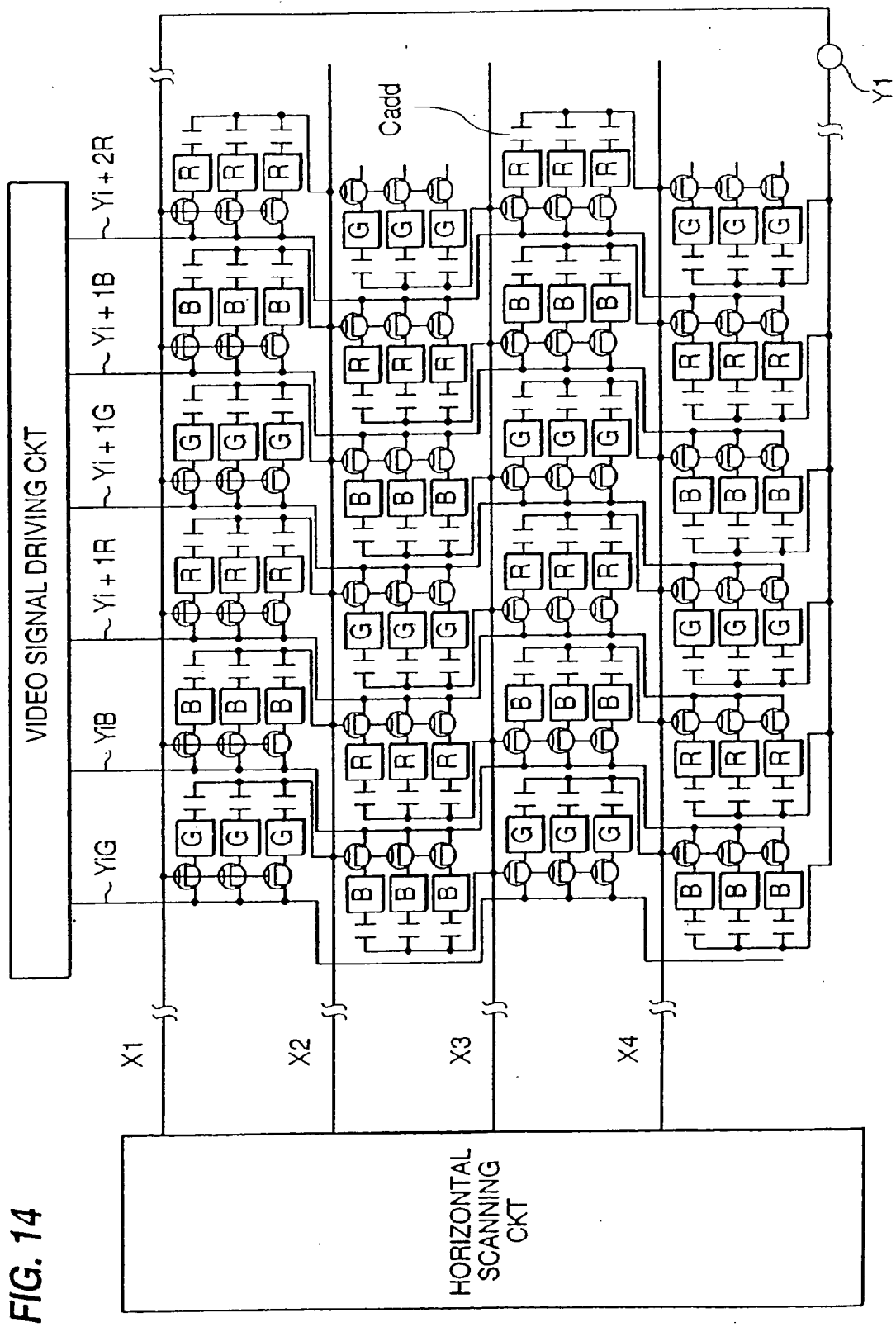

Adoption of this DC offset system may necessitate a step of, as shown in FIG. 14 (an equivalent circuit diagram illustrating the liquid crystal unit), connecting the scanning signal line GL (or the capacitance electrode line) of the first stage to the capacitance electrode line (or the scanning signal line GL) of the final stage. In FIG. 14, only four scanning signal lines are illustrated for convenience. In fact, however, several hundred pieces of scanning signal lines are disposed. The scanning signal line of the first stage is connected to the capacitance electrode line of the final stage through an inside wire in the liquid crystal display unit or the outside extension wire.

In the liquid crystal display device, as described above, the scanning signal lines GL and the capacitance electrode lines are all connected to a horizontal scanning circuit by connecting the scanning signal lines of the first stage to the capacitance electrode lines of the final stage. Hence, the DC offset system (DC cancel system) is allowed to be utilized. As a result, the DC component applied to the liquid crystal LC can be reduced, thereby improving the life span of the liquid crystal.

The present invention made by the present inventors has concretely been described so far on the basis of the illustrative embodiments. The present invention is not, however, limited to the above-described precise embodiments. As a matter of course, various changes or modifications may be effected therein without departing from the spirit or the scope of the invention.

For example, in accordance with the present invention, each individual pixel on the liquid crystal display unit of the liquid crystal display device can be split into two or four segments. If the number of divided segments of the pixel becomes too large, it follows that the opening rate goes down. As explained earlier, it is therefore adequate that the pixel be split into two or four segments. Even if the pixel is not divided, however, the light shielding effects can be obtained. The foregoing embodiment has presented a reverse stagger structure in which the formation is performed in the order of gate electrode→gate insulating film→semiconductor layer→source and drain electrodes. However, another reverse stagger structure in which the up-and-down relation or the sequence of formations are opposite to the former ones is also available in this invention.

Embodiment III

Figure 15A:
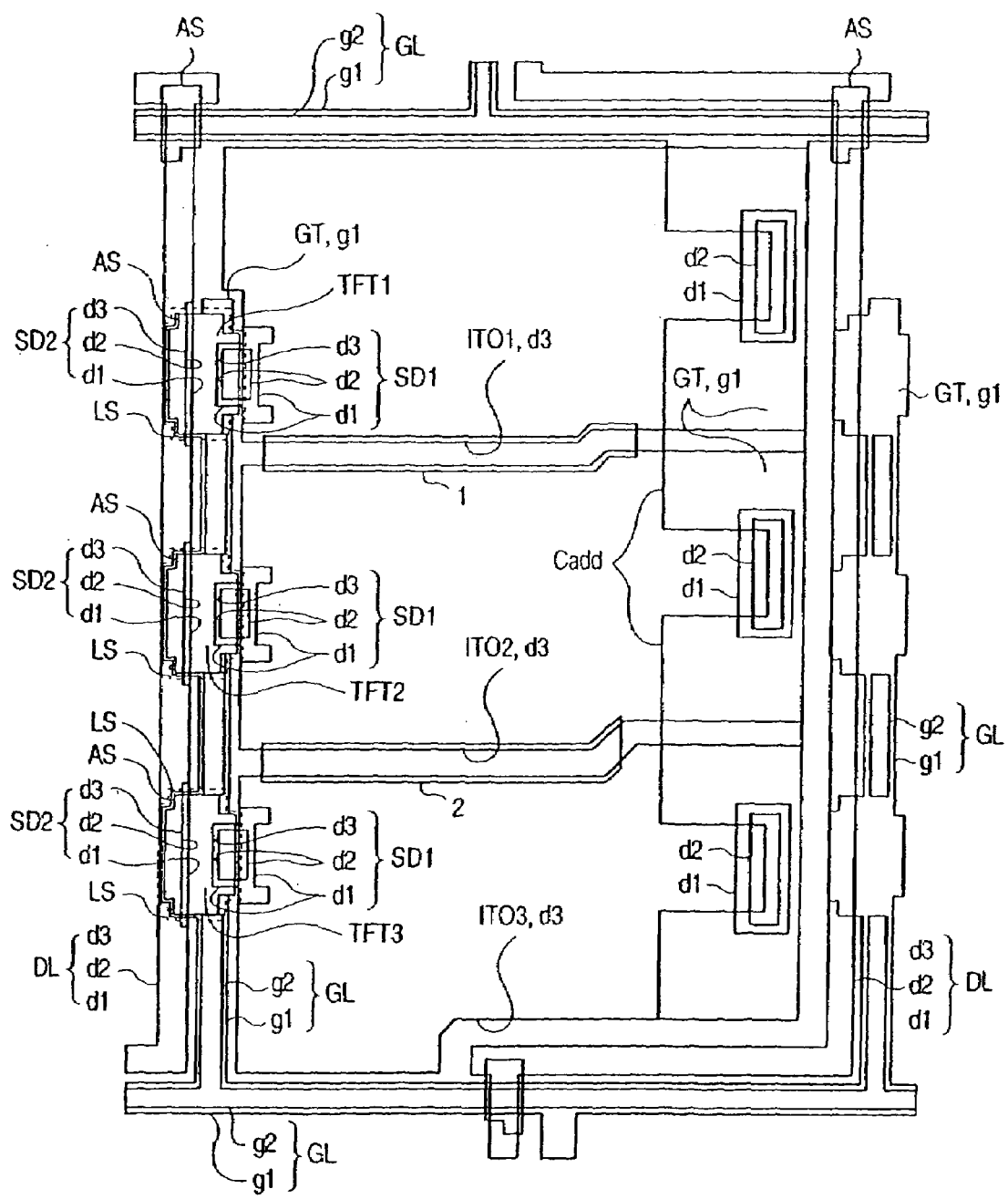
FIG. 15A is a plan view illustrating the principal portion of one pixel on the liquid crystal display unit of the active matrix color liquid crystal display device in which an embodiment III of the present invention is incorporated.
Figure 15B:
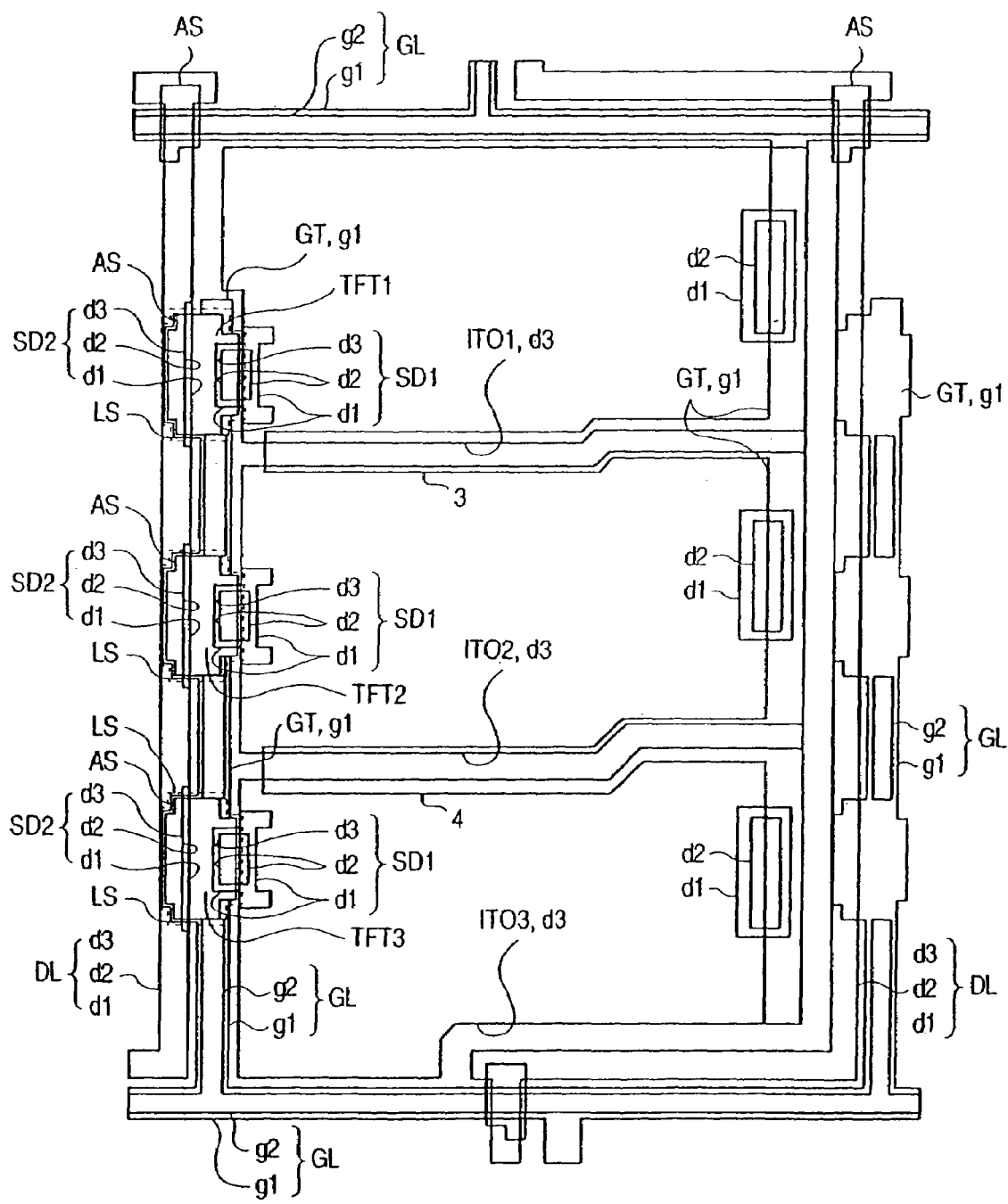
FIG. 15B is a plan view illustrating the principal portion of one pixel on the liquid crystal display unit of the color liquid crystal display device of the active matrix color liquid crystal device in which an embodiment IV of the present invention is incorporated.

Referring to FIG. 15A, there is shown an improvement of the embodiment of FIG. 8A. The modified point is that light shielding films 1 and 2 are formed between the divided pixel electrodes. The light shielding films 1 and 2 are formed of layers each assuming the same level as that of the first conductive film g1 employed for the scanning line GL and the electrode of the capacitor Cadd and the gate electrode GT. However, the light shielding films 1 and 2 are formed separately from the capacitor electrode and the gate electrode, and are electrically arranged to be in a floating state. Provided that for instance, the photomask or the etching process is deteriorated due to undesirable conditions in the manufacturing process, no deterioration is created even when the light shielding films are short-circuited to either the gate electrode GT or the capacitor electrode owing to the foregoing floating state.

According to this embodiment, there are obtained the light shielding effects equal to the backlight shielding effects associated with the gate electrode. It is possible to considerably restrict an amount of light leaking from gaps formed between the divided pixel electrodes ITO1 to ITO3. In addition, the black display becomes more clear than ever before, and this leads to enhancement of contrast.

Embodiment IV

The different point of an embodiment IV from the embodiment of FIG. 15A is that light shielding films 3 and 4 are formed in continuation (electrically connected to) from the scanning signal line GL or the electrode of the capacitor Cadd.

In this embodiment, the light shielding films 3 and 4 are short-circuited to the gate electrode GT for the reason of the above-described manufacturing process, in which case the two scanning lines are also short-circuited. The embodiment III is superior to this embodiment in terms of eliminating such an undesirable condition. However, the following points are more advantageous than the embodiment III.

(1) The scanning signal line GL is formed in continuation from its diverged line (capacitance electrode), which makes a spacing therebetween unnecessary. Consequently, the amount of leaked light can be further restricted.

(2) In combination with the light shielding effects, the capacitor Cadd described in the embodiment relative to the light can equivalently be formed between the pixel electrode and the adjacent scanning line; or alternatively a value of capacitance thereof can be increased. Therefore, if the value of auxiliary capacitor Cadd is kept constant, the opening rate becomes greater than in the embodiment III, whereby the display becomes brighter.

Note that a total superposition area of the divided pixel electrodes ITO1 to ITO3 and of the light shielding films 3 and 4 is made invariable in order to substantially equalize the values of respective auxiliary capacitors Cadd. The superposition area of the two light shielding films 3 and 4 and of the middle pixel electrode ITO2 overlapped with these light shielding films 3 and 4 is almost half that of the pixel electrodes ITO1 and ITO3 provided at both ends.

As discussed above, in the embodiments III and IV, the light leaking from the gaps between the divided pixels in the case of taking no measure is shielded by the light shielding films provided therebetween. Hence, there is yielded an effect of enhancing the contrast.

What is claimed is:

1. A thin film transistor (TFT) active matrix type liquid crystal display device comprising:

a first substrate and a second substrate;

a liquid crystal layer disposed between the first substrate and the second substrate;

a plurality of scanning signal lines formed over the first substrate;

an insulating film formed over the first substrate and the plurality of scanning signal lines;

a plurality of image signal lines formed over the insulating film;

a plurality of pixel regions, each of the plurality of the pixel regions being surrounded by two adjacent scanning signal lines of the plurality of scanning signal lines and two adjacent image signal lines of the plurality of image signal lines; and common transparent electrode formed over the second substrate, wherein each of the plurality of pixel regions contains a first divided pixel electrode comprising a first edge line, a second divided pixel electrode comprising a second edge line and a third edge line, and a third divided pixel electrode comprising a fourth edge line, and these divided pixel electrodes are supplied with an image signal from one of the two adjacent image signal lines, and wherein the first edge line, the second edge line, the third edge line, and the fourth edge line are inclined to the plurality of scanning signal lines, and there are formed a first area of space between the first edge line and the second edge line and a second area of space between the third edge line and the fourth edge line.

2. A TFT active matrix type liquid crystal display device according to claim 1, wherein the first edge line, the second edge line, the third edge line, and the fourth edge line are inclined at an angle of about 45 degrees to the plurality of scanning signal lines.

3. A TFT active matrix type liquid crystal display device according to claim 1, wherein the first edge line and the second edge line are in parallel.

4. A TFT active matrix type liquid crystal display device according to claim 3, wherein the second edge line, the third edge line, and the fourth edge line are in parallel.

5. A TET active matrix type liquid crystal display device according to claim 4, wherein the first edge line, the second edge line, the third edge line, and the fourth edge line are inclined at an angle of about 45 degrees to the plurality of scanning signal lines.

6. A TFT active matrix type liquid crystal dispiay device comprising:
a first substrate and a second substrate;
a liguid crystal layer disposed between the first substrate and the second substrate;
a plurality of scanning signal lines formed over the first substrate:
an insulating film formed over the first substrate and the plurality of scanning signal lines;
a plurality of image signal lines formed over the insulating film;
a plurality of pixel regions, each of the plurality of the pixel regions being surrounded by two adjacent scanning signal lines of the plurality of scanning signal lines and two adjacent image signal lines of the plurality of image signal lines; and
a common transparent electrode formed over the second substrate,
wherein each of the plurality of pixel regions contains a first divided pixel electrode comprising a first edge line, a second divided pixel electrode comprising a second edge line and a third edge line, and a third divided pixel electrode comprising a fourth edge line, and these divided pixel electrodes are supplied with an image signal from one of the two adjacent image signal lines,
wherein the first edge line, the second edge line, the third edge line, and the fourth edge line are inclined to the plurality of scanning signal lines, and there are formed a first area of space between the first edge line and the second edge line and a second area of space between the third edge line and the fourth edge line, and
wherein a light shielding film is disposed between the first area of space and the first substrate.

7. A TFT active matrix type liquid crystal display device according to claim 6, wherein the light shielding film is at a same level as the plurality of scanning signal lines.

8. A TFT active matrix type liquid crystal display device according to claim 7, wherein the light shielding film is overlapped with the first edge line and the second edge line.

9. A TFT active matrix type liquid crystal display device according to claIm 7, wherein the first edge line and the second edge line are in parallel.

10. A TFT active matrix type liquid crystal display device according to claim 9, wherein the second edge line, the third edge line, and the fourth edge line are in parallel.

11. A TFT active matrIx type liquid crystal display device according to claim 10, wherein the first edge line, the second edge line, the third edge line, and the fourth edge line are inclined at an angle of about 45 degrees to the plurality of scanning signal lines.

12. A thin film transistor (TFT) active matrix type liquid crystal display device comprising:
a first substrate and a second substrate;
a liquid crystal layer disposed between the first substrate and the second substrate;
a plurality of scanning signal lines formed over the first substrate;
an insulating film formed over the first substrate and the plurality of scanning signal lines;
a plurality of image signal lines formed over the insulating film;
a plurality of pixel regions, each of the plurality of the pixel regions being surrounded by two adjacent scanning signal lines of the plurality of scanning signal lines and two adjacent image signal lines of the plurality of image signal lines; and
a common transparent electrode formed over the second substrate,
wherein each of the plurality of pixel regions contains a first divided pixel electrode comprising a first edge line, a second divided pixel electrode comprising a second edge line and a third edge line, and a third divided pixel electrode comprising a fourth edge line, and these divided pixel electrodes are supplied with an image signal from one of the two adjacent image signal lines,
wherein the first edge line, the second edge line, the third edge line, and the fourth edge line are inclined to the plurality of scanning signal lines, and there are formed a first area of space between the first edge line and the second edge line and a second area of space between the third edge line and the fourth edge line, and
wherein a first backlight shielding film is disposed between the first area of space and the first substrate, and a second backlight shielding film is disposed between the second area of space and the first substrate.

13. A TFT active matrix type liquid crystal display device according to claim 12, wherein the first backlight shielding film and the second backlight shielding film are at a same level as the plurality of scanning signal lines.

14. A TFT active matrix type liquid crystal display device according to claim 13, wherein the first backlight shielding film is overlapped with the first edge line and the second edge line, and the second backlight shielding film is overlapped with the third edge line and the fourth edge line.

15. A TFT active matrix type liquid crystal display device according to claim 13, wherein the first edge line, the second edge line, the third edge line, and the fourth edge line are in parallel.

16. A TFT active matrix type liquid crystal display device according to claim 15, wherein the first edge line, the second edge line, the third edge line, and the fourth edge line are inclined at an angle of about 45 degrees to the plurality of scanning signal lines.

17. A thin film transistor (TFT) active matrix type liquid crystal display device comprising:
a first substrate and a second substrate;
a liquid crystal layer disposed between the first substrate and the second substrate;
a plurality of scanning signal lines formed over the first substrate;
an insulating film formed over the first substrate and the plurality of scanning signal lines;
a plurality of image signal lines formed over the insulating film;
a plurality of pixel regions, each of the plurality of the pixel regions being surrounded by two adjacent scanning signal lines of the plurality of scanning signal lines and two adjacent image signal lines of the plurality of image signal lines; and a common transparent electrode formed over the second substrate, wherein each of the plurality of pixel regions contains a first divided pixel electrode comprising a first edge line, and a second divided pixel electrode comprising a second edge line, and both divided pixel electrodes are supplied with an image signal from one of the two adjacent image signal lines, wherein the first edge line and the second edge line are inclined to the plurality of scanning signal lines, and there is formed an area of space between the first edge line and the second edge line, and wherein a layer which is at a same level as the plurality of scanning signal lines is disposed between said area of space and the first substrate.

18. A TFT active matrix type liquid crystal display device according to claim 17, wherein the layer is a backlight shielding film.

19. A TFT active matrix type liquid crystal display device according to claim 18, wherein the first edge line and the second edge line are in parallel.

20. A TFT active matrix type liquid crystal display device according to claim 19, wherein the first edge line and the second edge line are inclined at an angle of about 45 degrees to the plurality of scanning signal lines.

\* \* \* \* \*